US012671217B2

(12) United States Patent
Speckbacher

(10) Patent No.: US 12,671,217 B2
(45) Date of Patent: Jun. 30, 2026

(54) ELECTRICAL PLUG CONNECTOR AND ELECTRICAL PLUG CONNECTION

(71) Applicant: ROSENBERGER HOCHFREQUENZTECHNIK GMBH & CO. KG, Fridolfing (DE)

(72) Inventor: Hubert Speckbacher, Muehldorf am Inn (DE)

(73) Assignee: ROSENBERGER HOCHFREQUENZTECHNIK GMBH & CO. KG, Fridolfing (DE)

( * ) Notice: Subject to any disclaimer, the term of this patent is extended or adjusted under 35 U.S.C. 154(b) by 346 days.

(21) Appl. No.: 18/595,915

(22) Filed: Mar. 5, 2024

(65) Prior Publication Data

US 2024/0305045 A1    Sep. 12, 2024

(30) Foreign Application Priority Data

Mar. 6, 2023 (EP) .................................... 23160097

(51) Int. Cl.
*H01R 24/40* (2011.01)
*H01R 13/40* (2006.01)

(52) U.S. Cl.
CPC ............ *H01R 24/40* (2013.01); *H01R 13/40* (2013.01)

(58) Field of Classification Search
None
See application file for complete search history.

(56) References Cited

U.S. PATENT DOCUMENTS

| | | | |
|---|---|---|---|
| 3,077,513 | A | 2/1963 | Felts |
| 2021/0091503 | A1 | 3/2021 | Mori |

FOREIGN PATENT DOCUMENTS

| | | | |
|---|---|---|---|
| DE | 918880 | C | 10/1954 |
| DE | 1105023 | B | 4/1961 |
| DE | 8816382 | U1 | 7/1989 |
| DE | 102018126448 | A1 | 4/2020 |

OTHER PUBLICATIONS

European Patent Office Search Report issued in App. No. EP23160097.4, dated Sep. 15, 2023, 9 pages (with an English language text on the second page).

*Primary Examiner* — Ross N Gushi
(74) *Attorney, Agent, or Firm* — Koffsky Schwalb LLC

(57) ABSTRACT

An electrical plug connector has an inner conductor contact element and an isolator element which encases the inner conductor contact element at least in portions. A blocking structure is formed on an external face of the inner conductor contact element, and a counter-blocking structure is formed on an internal face of the isolator element. The blocking structure and the counter-blocking blocking in a blocked state impact axially on one another, and in an unblocked state are movable axially relative to one another. The isolator element, at least in an axial portion in which the counter-blocking structure is formed, has a cross-sectional profile that is dimensionally elastic in such a manner that a spacing between two mutually opposite regions of the internal face is variable when transitioning between the blocked state and the unblocked state. The elastic cross-sectional profile has an invariable internal circumference.

23 Claims, 10 Drawing Sheets

ELECTRICAL PLUG CONNECTOR AND ELECTRICAL PLUG CONNECTION

FIELD OF THE INVENTION

The present invention relates to an electrical plug connector having an inner conductor contact element and an isolator element which encases the inner conductor contact element at least in portions. A blocking means is herein formed on an external face of the inner conductor contact element, and a counter-blocking means is formed on an internal face of the isolator element, said blocking means and counter-blocking means blocking one another in a fixed state.

The present invention moreover relates to an electrical plug connection consisting of an electrical plug connector and an associated electrical mating plug connector.

TECHNICAL BACKGROUND

Various electrical plug connectors are known in electrical engineering. As is known, electrical plug connectors serve to transmit electrical outputs and/or electrical data signals to further plug connectors, or to corresponding mating plug connectors. A plug connector, or a mating plug connector, can be a plug, a circuit board plug, a panel plug, a socket, a coupler, a capacitive coupler, or an adapter. The terms "plug connector" or "mating plug connector" used in the context of the invention represent all variants.

The transmission of an electrical output, or of an electrical data signal, between an electrical plug connector and an electrical mating plug connector takes place by way of the electrical contact between a contact element of the plug connector and an associated mating contact element of the mating plug connector. In order to implement a reliable electrical contact, the single contact element is to be positioned correctly both axially as well as laterally within the plug connector housing of the plug connector. The correct axial positioning of the contact element is usually implemented by a forward detent, or by a primary locking mechanism, or a primary latching mechanism of the contact element, respectively. In the case of an unshielded plug connector, axial fixing of the inner conductor contact element takes place on the electrically isolating plug connector housing. In a shielded plug connector, the inner conductor contact element is axially fixed on the isolator element, and the outer conductor contact element is axially fixed on the isolator element and/or on the plug connector housing.

There are substantially two technical principles of the primary locking mechanism. In a first variant of the primary locking mechanism, the elastic latching element, in most instances designed as a latching hook or a latching lance, is formed on the contact element which latches into a counter-latching element of the isolator element, or of the plug connector housing. The counter-latching element is in most instances formed as a latching recess or as a shoulder. In a second variant of the primary locking mechanism, the elastic latching element is formed in the isolator element, or in the plug connector housing, which latches into a counter-latching element of the contact element.

Forming an elastic latching element of the primary locking mechanism in the isolator element necessitates slitting of the isolator element. This shortens the spacing between the live components—the contact elements—along the surface of the isolator element, i.e. the so-called creepage distance, and may lead to electrical shorting between the contact elements.

This is a situation that needs improvement.

SUMMARY OF THE INVENTION

Against this background, it is the object of the present invention to specify an electrical plug connector with an extended creepage distance and thus a higher degree of insulation between the live contact elements.

This object is achieved according to the invention by an electrical plug connector having the features disclosed herein.

Accordingly provided is:

An electrical plug connector having an inner conductor contact element, and
 an isolator element which encases the inner conductor contact element at least in portions,
 wherein a blocking means is formed on an external face of the inner conductor contact element, and
 a counter-blocking means is formed on an internal face of the isolator element,
 wherein the blocking means and the counter-blocking means in a blocked state impact axially on one another, and in an unblocked state are movable axially relative to one another,
 wherein the isolator element, at least in an axial portion in which the counter-blocking means is formed, has a cross-sectional profile that is dimensionally elastic in such a manner that a spacing between two mutually opposite regions of the internal face is variable when transitioning between the blocked state and the unblocked state,
 wherein the elastic cross-sectional profile has an invariable internal circumference, wherein
 i) the counter-blocking means is formed as at least one region of the internal face that extends in each case in a circumferential direction of the isolator element orthogonal to the longitudinal axis of the plug connector solely in a segment, wherein a spacing of the internal face from the longitudinal axis is each segment associated with the counter-blocking means is reduced in comparison to the spacing of the internal face from the longitudinal axis in each neighboring segment extending in the circumferential direction; or
 ii) the blocking means is formed as at least one region of the external face that extends in each case in the circumferential direction orthogonal to the longitudinal axis of the plug connector solely in a segment of the external face, wherein in each segment associated with the blocking means a spacing of the external face from the longitudinal axis is in each case enlarged in comparison to the spacing of the external face from the longitudinal axis in each neighboring segment extending in the circumferential direction.

In the plug connector, a blocking means is formed on an external face of the inner conductor contact element, and an associated counter-blocking means is formed on an internal face of the isolator element. The "internal face" of the isolator element herein and hereunder is understood to mean a lateral or casing face on the inside wall of a feedthrough formed in the isolator element. The "external face" of the inner conductor contact element herein and hereunder is understood to mean a lateral or casing face on the outside wall of the inner conductor contact element.

The concept/idea on which the present invention is based lies in implementing the elasticity required for fixing by way of an integral elastic configuration of the isolator element, preferably by way of an integral elastic configuration of the axial portion of the isolator element in which the counter-blocking means is formed.

Achieved in this way is a technical solution in which the elasticity of the counter-latching means is implemented not solely in a locally delimited manner in the isolator element by means of locally slitting the isolator element, but by way of an elastic configuration of a larger portion of the isolator element without slitting the isolator element. Advantageously achieved in this way are shortened creepage distances between live contact elements, and thus a reduction in terms of the probability of electrical shorting between the live contact elements.

The integral elastic configuration of the isolator element, i.e. the structural elasticity of the isolator element, is formed by a dimensionally elastic cross-sectional profile of the isolator element, which means it can be “elastic in shape”. The dimensionally elastic cross-sectional profile of the isolator element is implemented by way of a deformability of the cross-sectional profile while maintaining an unchanged internal circumference of the cross-sectional profile. In this way, there is no deformability on account of an outward or inward lateral or radial expansion of the isolator element by means of a displacement of material in the isolator element. The “internal circumference” of the cross-sectional profile of the isolator element herein is understood to mean the circumferential length on the internal face of the isolator element in the circumferential direction, measured orthogonally to the longitudinal axis of the plug connector.

As a result of the elastic deformability of the cross-sectional profile of the isolator element, a spacing between the mutually opposite regions of the internal face of the isolator element in which the counter-blocking means is formed is variable. In this way, a blocking mechanism between the blocking means and the counter-blocking means can be adjusted or alternatively released in the blocked state, and therefore a transition between a blocked state and an unblocked state in which the blocking means and the counter-blocking means are released from one another can be implemented.

In the unblocked state, the blocking means and the counter-blocking means are able to be moved axially relative to one another. In this way, the inner conductor contact element can be moved to its axial fixing position in the isolator element during the assembly process, or alternatively be released from its fixing position during a disassembly process.

In the blocked state, the blocking means and the counter-blocking means impact axially on one another. In this way, the movable component of the plug connector, i.e. typically the inner conductor contact element which has the blocking means, is blocked in terms of its movement at least in a longitudinal axial direction of the plug connector. If blocking is present in both longitudinal axial directions of the plug connector, the inner conductor contact element is thus fixed on the isolator element. If only one blocking mechanism of the blocking means is formed in a single longitudinal axial direction of the plug connector on the counter-blocking means, fixing of the inner conductor contact element on the isolator element can thus be implemented as follows, for example:

In a first variant, a further blocking means can be formed on the inner conductor contact element for this purpose, which further blocking means is able to be blocked in the respective opposite longitudinal axial direction of the plug connector by a further counter-blocking means formed on the isolator element. In a second variant—without forming of a further blocking means—a frontal end of the inner conductor contact element can impact on a further counter-blocking means, for example a touch protection which is in each case formed as a detent on the isolator element.

In a first development of the invention, the counter-blocking means is formed as at least one region of the internal face that extends in each case in the circumferential direction of the isolator element orthogonal to the longitudinal axis of the plug connector only in an associated segment. A spacing of the internal face from the longitudinal axis in each segment associated with the counter-blocking means herein is in each case reduced in comparison to the spacing of the internal face from the longitudinal axis in each neighboring segment extending in the circumferential direction. In a second development of the invention, the blocking means of the inner conductor contact element is formed as at least one region of the external face that extends in each case in the circumferential direction of the inner conductor contact element orthogonal to the longitudinal axis of the plug connector only in an associated segment. In each segment associated with the blocking means herein a spacing of the external face from the longitudinal axis is in each case enlarged in comparison to the spacing of the external face from the longitudinal axis in each neighboring segment extending in the circumferential direction.

In a first embodiment of the first inventive development, the individual region of the counter-blocking means that extends in each case in the circumferential direction of the isolator element orthogonal to the longitudinal axis of the plug connector only in a segment of the internal face of the isolator element, and the internal face of which has a reduced spacing from the longitudinal axis of the plug connector, can preferably be formed as a web on the internal face. In a first embodiment of the second inventive development, in an equivalent manner, the individual region of the blocking means that extends in each case in the circumferential direction of the isolator element orthogonal to the longitudinal axis of the plug connector only in a segment of the external face of the inner conductor contact element, and the external face of which has an enlarged spacing from the longitudinal axis of the plug connector can preferably be formed as a web on the external face.

Alternatively, in a second embodiment of the first inventive development, an encircling web can be formed on the internal face of the isolator element in the axial region of the counter-blocking means, which web in the regions, or in the segments, of the counter-blocking means has an internal face with a reduced spacing from the longitudinal axis of the plug connector in comparison to the internal face in the neighboring segments of the encircling web that extend in the circumferential direction. In a second embodiment of the second inventive development, in an equivalent manner, an encircling web can be formed on the external face of the inner conductor contact element in axial regions of the blocking means, which web in the regions, or in the segments, of the blocking means has an external face with an enlarged spacing from the longitudinal axis of the plug connector in comparison to the external face in the neighboring segments of the encircling web that extend in the circumferential direction.

Only the first embodiment of a configuration of a web will be described hereunder. This is not to be considered a limitation, however. The technical aspects described in the context of the first embodiment of a configuration of the web also apply in an equivalent manner to the second embodiment of a web.

A web herein and hereunder is understood to mean a reduction in terms of a radial or a lateral spacing of a specific region of the internal face of the isolator element from the longitudinal axis of the isolator element, or an enlargement of a radial or of a lateral spacing of a specific region of the external face of the inner conductor contact element from the longitudinal axis of the plug connector.

As a result of the web being formed only in a lateral segment, or only in an angular segment, of the isolator element or of the inner conductor contact element, the elastic cross-sectional profile of the isolator element in the unblocked state of assembly, or of disassembly, proceeding from the longitudinal axis of the plug connector, has to be enlarged in a single direction and/or in a single opposite direction, and in the blocked state has to be reduced in a single direction and/or in a single opposite direction. This single expansion direction, or expansion counter-direction, of the elastic isolator element is the direction, or the opposite direction, in which a web of the counter-blocking means is in each case formed (second inventive development), or in which the counter-blocking means interacts in each case with a web of the blocking means of the inner conductor contact element (first inventive development).

The web can be formed as a cam, a hook or a rib. A rib-shaped web can preferably be used, the longitudinal extent of said web, i.e. the longer extent of the latter, extending in a direction orthogonal to the longitudinal axial direction of the plug connector.

In order to improve the fixing of the counter-blocking means to the associated blocking means, the detent face of the web of the counter-blocking means that impacts in each case on the blocking means can be shaped as a protrusion which has a radially or laterally oriented, or an approximately radially or an approximately laterally oriented flank.

If the blocking means is formed as a web, the associated counter-blocking means in the isolator element in a first development of the counter-blocking means can in each case be formed as a double web having an intervening groove into which the web of the inner conductor contact element is able to be latched in the blocked state and in this way able to be fixed in both longitudinal axial directions of the plug connector. Alternatively, in the first development of the blocking means, the blocking means can be formed as a double web of the inner conductor contact element having an intervening groove into which the web of the isolator element is able to be latched in the blocked state, and in this way able to be fixed in both longitudinal axial directions of the plug connector.

In a second development of the counter-blocking means, the associated counter-blocking means in the isolator element can be formed as a groove in the internal face of the isolator element into which the web of the inner conductor contact element is able to be latched in the blocked state and in this way is able to be fixed in both longitudinal axial directions of the plug connector. Alternatively, in the second development of the blocking means, the associated blocking means in the inner conductor contact element can be formed as a groove in the external face of the inner conductor contact element into which the web of the isolator element is able to be latched in the blocked state and in this way is able to be fixed in both longitudinal axial directions of the plug connector.

In the first and in the second development, the groove is in each case formed so as to complement the web, i.e. the size and the shape of the groove in the longitudinal axial direction of the plug connector complements the size and the shape of the web in the longitudinal axial direction of the plug connector, so as to implement a secure axial fixing of the inner conductor contact element in the isolator element and a coaxial alignment of the isolator element to the inner conductor contact element.

In a third development of the counter-blocking means, the associated counter-blocking means in the isolator element can be formed as a single web on the internal face of the isolator element on which the web of the inner conductor contact element impacts and in this way is blocked in a longitudinal axial direction of the plug connector. Alternatively, in the third development of the blocking means, the associated blocking means in the inner conductor contact element can be formed as a single web of the inner conductor contact element on which the web of the isolator element impacts and in this way is blocked in a longitudinal axial direction of the plug connector.

In a fourth development of the counter-blocking means, the associated counter-blocking means in the isolator element can be formed as a protrusion from a portion of the isolator element having a smaller lateral or radial extent toward a portion of the inner conductor contact element having a larger lateral or radial extent. The web of the inner conductor contact element can impact on the protrusion and in this way be blocked in a longitudinal axial direction of the plug connector. Alternatively, in the fourth development of the blocking means, the associated blocking means in the inner conductor contact element can be formed as a protrusion from a portion of the inner conductor contact element having a smaller lateral or radial extent toward a portion having a larger lateral or radial extent. The web of the isolator element can impact on the protrusion and in this way be blocked in a longitudinal axial direction of the plug connector.

The groove of the first and of the second development formed in each case in the inner conductor contact element or in the isolator element, the web of the third development formed in the inner conductor contact element, and the protrusion of the fourth development formed in the inner conductor contact element, can in each case preferably be formed in an annular, encircling manner. This represents the simplest development in terms of production technology (turned groove, turned web and turned protrusion in the rotationally symmetrical inner conductor contact element; embossed groove, embossed web and embossed protrusion along the entire lateral wall of the inner conductor contact element formed as a flat contact). Moreover, no phase-conform assembly of the individual inner conductor contact element in the isolator element is required for this purpose either.

The electrical plug connector can preferably be a straight plug connector. However, the scope of the invention also includes an angular plug connector.

The electrical plug connector has at least one inner conductor contact element. The inner conductor contact element can preferably be a contact element having a rotationally symmetrical cross-sectional profile, i.e. a round contact element which establishes radial contact with a mating contact element which is likewise formed to be rotationally symmetrical. The inner conductor contact element can be formed in both types of gender. The inner conductor contact element is preferably shaped as a pin contact (male). However, the female variant of the inner conductor contact element as a socket contact is also conceivable.

Alternatively, the inner conductor contact element can also be formed as a flat contact in both types of gender, i.e. as a contact blade (male) or as a contact receptacle having a preferably U-shaped cross-sectional profile (female). The female flat contact preferably has a plug-in direction in a longitudinal axial direction of the plug connector (180°). A variant of the female flat contact which is able to be plugged in at least one direction perpendicular (±90°) to the longitudinal axial direction of the plug connector is also conceivable and included in the scope of the invention. Finally, a female flat contact which is able to be plugged in a longitudinal axial direction of the plug connector (180°) and in at least one direction perpendicular (±90°) to the longitudinal axial direction of the plug connector is also conceivable. Finally, a flat contact may also be embodied as a cable shoe.

In particular, the inner conductor contact element formed as a round contact, as well as the inner conductor contact element formed as a flat contact, can preferably be embodied as a direct contact in which the inner conductor contact element electrically contacts the inner conductor mating contact element directly. However, the scope of the invention also includes electrical contacting between the inner conductor contact element and the inner conductor mating contact element by way of an intervening contact sleeve or an intervening contact plate, each having a plurality of contact leaves.

The isolator element has a dimensionally elastic cross-sectional profile and is therefore preferably embodied with thin walls. Moreover, the isolator element can be produced from a dielectric material with sufficient elastic characteristics such as, for example, polyamide (PA), polyethylene terephthalate (PET), polyoxymethylene (POM), polytetrafluoroethylene (PTFE). As opposed to an elastomer, the surface of the latter being able to be enlarged or reduced by a displacement of material, a thermoplastic or thermosetting material has an elasticity which enables the isolator element to be only deformed or bent without the surface of the isolator element being enlarged or reduced, respectively.

The isolator element, which encases the at least one inner conductor contact element in at least one axial portion, can preferably be formed in the shape of a sleeve and have a number of feedthroughs, or receptacle chambers for the individual inner conductor contact elements, corresponding to the number of inner conductor contact elements. In a straight plug connector, the isolator element on the frontal end, i.e. in the longitudinal axial direction of the plug connector, has an opening for plugging in the at least one inner conductor mating contact element of an electrical mating plug connector. In an inner conductor contact element formed as a round contact, the isolator element has a substantially round cross-sectional profile, and in an inner conductor contact element formed as a flat contact, the isolator element has a substantially rectangular cross-sectional profile. A web which is directed laterally or radially inward, and as a touch protection covers the frontal end of the inner conductor contact element, can preferably be formed on the frontal end of the isolator element.

In an angled plug connector, the isolator element, preferably in a region neighboring the frontal end of the plug connector, can have on one side, i.e. in a direction perpendicular to the longitudinal axial direction of the plug connector, an opening for plugging in the at least one inner conductor mating contact element of a mating plug connector.

The cross-sectional profile of the isolator element of an angled plug connector which has an inner conductor contact element formed in each case as a U-shaped flat contact or as a cable shoe, can thus have a U-shaped cross-sectional profile in the region of the lateral opening. The counter-blocking means can be formed in the opposite lateral walls of the isolator element, in the axial portion of the U-shaped cross-sectional profile formed to be dimensionally elastic. In the blocked state, the counter-blocking means can be blocked by an associated blocking means of the U-shaped flat contact or of the cable shoe. The individual developments already illustrated in the context of the round contact can be applied in an equivalent manner to the blocking means of the U-shaped flat contact or the cable shoe, and to the counter-blocking means of the isolator element having a U-shaped cross-sectional profile. In particular, either the blocking means or the counter-blocking means is in each case formed as at least one web on the external face of the inner conductor contact element, or on the internal face of the two lateral walls of the isolator element, respectively. The U-shaped cross-sectional profile of the isolator element in the blocked state preferably transitions into a cross-sectional profile having lateral walls which are obliquely tilted outward in the lateral direction in the unblocked state (approximately V-shaped cross-sectional profile).

In a round contact, the individual web preferably extends in each case within a segment, i.e. an angular segment, of preferably 5° to 80°, particularly preferably between 10° and 60°, and most particularly between 20° and 40°. In a flat contact, the individual web preferably extends in each case within a segment of preferably 5% to 80% of the contact face width, particularly preferably between 10% and 60% of the contact face width, and most particularly between 20% and 40% of the contact face width.

Advantageous design embodiments and refinements are derived from the description with reference to the figures of the drawing.

It is to be understood that the features mentioned above and yet to be explained hereunder can be used not only in the respective combination stated, but also in other combinations or individually, without departing from the scope of the present invention.

Forming a single web on the internal face of the isolator element in combination with forming an associated blocking means on the external face of the inner conductor contact element in a first development according to the invention, or alternatively forming a single web on the external face of the inner conductor contact element in combination with forming an associated counter-blocking means on the internal face of the isolator element in a second development according to the invention, enables in each case a functioning primary locking mechanism. In order to improve the primary locking mechanism, two webs can preferably be formed on the internal face of the isolator element or, alternatively, two webs can preferably be formed on the external face of the inner conductor contact element.

In a preferably first development of the invention, one web can be formed in each case in at least one mutually opposite region of the two mutually opposite regions on the internal face of the isolator element, the spacing of said regions being in each case variable by virtue of the elastic cross-sectional profile. Alternatively, in the second development according to the invention, one web can in each case be formed in at least one mutually opposite region of the two mutually opposite regions on the external face of the inner conductor contact element, said regions being in each case adjacent laterally or radially to a mutually opposite region of the two mutually opposite regions of the internal face of the isolator element, the spacing of said regions being in each case variable by virtue of the elastic cross-sectional profile.

As opposed to a fully circumferential enlargement or a fully circumferential reduction of the elastic cross-sectional profile, an enlargement or reduction of the elastic cross-sectional profile of the isolator element in a single direction and/order in a single opposite direction, requires a higher retaining force between the inner conductor contact element and the isolator element in the fixed state. Moreover, the risk of breakage when elongating the isolator element is reduced as a result. Finally, in terms of fixing, a higher degree of robustness in relation to production tolerances is obtained as a result.

It is also conceivable that a greater number of webs than two webs are formed, which are in each case formed in mutually opposite regions of the internal face of the isolator element or of the external face of the inner conductor contact element. The plurality of blocking means and the plurality of counter-blocking means can preferably be disposed at the same axial position of the inner conductor contact element, or of the isolator element, respectively. Also conceivable is an implementation in which the individual blocking means and the associated counter-blocking means are in each case implemented at different axial positions of the inner conductor contact element, or of the isolator element, respectively.

Moreover, in a preferable development of the invention for implementing an efficient primary locking mechanism in the blocked state, the spacing between the two mutually opposite regions of the internal face of the isolator element in the blocked state is reduced in comparison to the spacing between the two mutually opposite regions of the internal face of the isolator element in the unblocked operation.

In the first development according to the invention, the spacing between the two mutually opposite regions of the internal face of the isolator element, in which regions a web is in each case formed in at least one mutually opposite region, can be enlarged in such a way that the at least one web protrudes beyond the highest radial or lateral elevation of the blocking means. In this way, the at least one web can be released from the associated blocking means, and the blocking means and the associated counter-blocking means can be transferred to the unblocked state. In the unblocked state, the spacing between the two mutually opposite regions of the internal face of the isolator element is at least the size of the largest spacing between two mutually opposite regions of the external face of the inner conductor contact element.

Alternatively, in the second development according to the invention, the spacing between two mutually opposite regions of the internal face of the isolator element can be enlarged in such a manner that the two mutually opposite regions of the internal face of the isolator element protrude beyond the two respective laterally or radially adjacent mutually opposite regions on the external face of the inner conductor contact element, in which regions a web is in each case formed in at least one mutually opposite region. In this way, the at least one web formed on the external face of the inner conductor contact element can be released from the associated counter-blocking means, and the blocking means and the associated counter-blocking means can be transferred to the unblocked state. In the unblocked state, the spacing between the mutually opposite regions of the external face, in which regions a web is in each case formed in at least one mutually opposite region of the external face of the inner conductor contact element, is at least the size of the smallest spacing between two mutually opposite regions of the internal face of the isolator element.

In both alternatives, an enlargement of the spacing between two mutually opposite regions of the external face of the isolator element takes place when transitioning between the blocked state and the unblocked state. Sufficient available space to enable an enlargement of the spacing between two mutually opposite regions of the external face of the isolator element is to be provided within the plug connector, i.e. within the plug connector housing in the case of an unshielded plug connector, or within the external conductor contact element in the case of a shielded plug connector.

In a preferred development of the invention, the isolator element, in the axial portion in which the counter-blocking means is formed, is designed in the shape of a sleeve, and thus has a closed cross-sectional profile. Because the internal circumferential length of the elastic cross-sectional profile of the isolator element is unchanged, when the spacing between two mutually opposite regions of the internal face is enlarged in a closed cross-sectional profile of the isolator element, a reduction of the spacing between two further mutually opposite regions of the internal face, which are located at the same axial position as the counter-blocking means, occurs.

The connecting line between the further mutually opposite regions of the internal face, the spacing thereof being reduced, is preferably oriented orthogonally to the connecting line between the two mutually opposite regions of the internal face of the isolator element in which the counter-blocking means is formed, and of which the spacing is enlarged. A preferably round cross-sectional profile of the isolator element in the blocked state transitions into an elliptic cross-sectional profile of the isolator element in the unblocked state. A preferably rectangular cross-sectional profile of the isolator element in the blocked state transitions into a rectangular cross-sectional profile of the isolator element, having one lengthened axis and one shortened axis, in the unblocked state.

In order to minimize or completely preclude any electrical shorting between live contact elements, in a preferred development of the invention, the isolator element, irrespective of the design embodiment of the elasticity required for the latching mechanism, at least in the axial region of the counter-latching means, and in particular over the entire axial extent, has a closed lateral wall which is free from feedthroughs. The creepage distance is advantageously enlarged to the distance on the surface between two live contact elements.

The creepage distance for electrical shorting between an inner conductor contact element and an outer conductor contact element results from at least the axial spacing between the frontal end of the inner conductor contact element and the frontal end of the isolator element, and the axial spacing between the frontal end of the isolator element and the fixing of the isolator element on the outer conductor contact element. The creepage distance can be lengthened in particular in that the fixing of the isolator element, for example on a web or on a shoulder of the outer conductor contact element, is disposed as far away as possible from the frontal end of the isolator element.

The creepage distance for electrical shorting between two inner conductor contact elements results from the two axial spacings between the frontal end of the isolator element and the frontal end of the two inner conductor contact elements. A lengthening of the creepage distance can be implemented, for example, in that the frontal ends of the two inner conductor contact elements are set back far from the frontal end of the isolator element.

If the plug connector is embodied as a straight plug connector and thus has an isolator element which completely encases the inner conductor contact element in a radial or lateral direction, the isolator element at least in the axial region of the counter-latching means, and preferably along the entire axial extent, has a closed sleeve-shaped lateral wall which is free from feedthroughs.

If the plug connector is embodied as an angled plug connector, and the sleeve-shaped isolator element in the axial portion of the counter-latching means has a lateral wall with a feedthrough for contacting the inner conductor mating contact element, the isolator element, at least in the axial region and in the lateral region in which the counter-latching means is formed, has a closed sleeve-shaped lateral wall which is free from feedthroughs.

In an angled plug connector, the inner conductor contact element is connected to the outer conductor contact element in the shortest possible way by way of the external face of the isolator element, between the lateral opening of the isolator element up to the lateral opening of the outer conductor contact element. This distance thus represents the critical creepage distance. In order for this critical creepage distance to be lengthened, in a preferable development of an angled plug connector the isolator element, on the outer casing from the lateral opening of the isolator element up to the lateral opening of the outer conductor contact element, is rib-shaped or meanders in the longitudinal axial direction of the plug connector.

In a further preferred development of the invention, the plug connector can have a secondary locking element which additionally secures the primary locking mechanism.

The secondary locking element can preferably be configured as a primary locking reinforcement (PLR) element. The secondary locking element, configured as a primary locking reinforcement element comprises mutually opposite regions of the isolator element, wherein the counter-latching means is in each case formed in at least one of the mutually opposite regions of the isolator element.

The secondary locking element in a plug-in direction can have a rear first region, which is of a stiffened configuration and secures the primary locking mechanism, and can have a front second region in a plug-in direction which adjoins the rear first region in the plug-in direction of the secondary locking element. The front second region is elastically configured, or is spaced apart laterally or radially from the isolator element, and enables the primary locking mechanism to transition between the blocked state and the unblocked state.

In the case of a straight plug connector, the secondary locking element can be inserted into the space between the isolator element and the outer conductor contact element, or the plug connector housing, by way of the frontal opening of the plug connector. The secondary locking element encases the isolator element at least in portions. The secondary locking element can be positionable axially in a preliminary latching position and in a terminal latching position.

By inserting the secondary locking element through a frontal opening of the plug connector, the secondary locking element can be positionable in a preliminary latching position in a first assembly step. The secondary locking element in the preliminary latching position can be positionable axially in the plug connector in such a manner that the front second region of the secondary locking element is laterally or radially adjacent to the axial portion in which the counter-blocking means is formed. “Laterally or radially adjacent” herein and hereunder is understood to be laterally adjacent in a direction orthogonal to the longitudinal axis of the isolator element. The front first region of the secondary locking element is elastically configured in such a manner, or is spaced apart laterally or radially from the isolator element in such a manner, that the region of the isolator element in which the counter-blocking means is formed, is able to be moved laterally or radially outward. In this way, the dimensionally elastic cross-sectional profile of the isolator element can enlarge in a cross-sectional direction in the axial region in which the counter-latching means is formed. If the secondary locking element is in the preliminary latching position, it is possible for the blocking means and the counter-blocking means to transition between a blocked state and an unblocked state.

By axially displacing the secondary locking element in the plug-in direction in a second assembly step, the secondary locking element moves from the preliminary latching position to the terminal latching position. In the terminal latching position the secondary locking element is positioned axially in the plug connector in such a manner that the rear first region of the secondary locking element is laterally or radially adjacent to the axial portion of the isolator element in which the counter-blocking means is formed. Because the rear first region of the secondary locking element is of a stiffened configuration, the region of the isolator element in which the counter-blocking means is formed is not able to be moved laterally or radially outward. If the secondary locking element is in the terminal latching position, transitioning of the blocking means and of the counter-blocking means between a blocked state and an unblocked state is thus prevented. The blocking means and the counter-blocking means remain fixed in the blocked state. The reduced spacing between the mutually opposite regions of the internal face of the isolator element, in which a web is in each case formed in at least one mutually opposite region of the internal face of the isolator element, is maintained.

In a straight plug connector, the secondary locking element can advantageously be embodied to be sleeve-shaped, having a closed lateral wall which is free from feedthroughs. If the secondary locking element is additionally produced from a dielectric material (thermoplastic or thermosetting material), the secondary locking element which is disposed between the isolator element and the external conductor contact element, or the plug connector housing, respectively, can additionally increase the electrical isolation capability between the outer conductor contact element and the inner conductor contact element.

The secondary locking element can preferably be configured as a_primary locking reinforcement (PLR) element also in the case of an angled plug connector.

In an angled plug connector, the secondary locking element can be inserted into the region between the isolator element and the outer conductor contact element, or the plug connector housing, respectively, laterally by way of the lateral openings of the isolator element, of the outer conductor contact element, or of the plug connector housing, respectively, and be positioned in a preliminary latching position and in a terminal latching position.

The secondary locking element for the angled plug connector, in a rear first region which is of a stiffened configuration, has at least three lateral walls, and in an adjoining front second region has at least two lateral walls and preferably two lateral walls.

Two respective mutually opposite lateral walls in the rear first region of the secondary locking element are mutually stiffened by way of the third lateral wall. The fourth lateral wall of the secondary locking element can be absent in a first development, or be formed and have a clearance in a second development. The isolator element can be guided through as a result of the absent fourth lateral wall, or as a result of the clearance of the fourth lateral wall, respectively. In the terminal latching position of the secondary locking element, the two mutually opposite lateral walls of the rear first region of the secondary locking element are in each case laterally adjacent to an axial portion of two mutually opposite lateral walls of the isolator element in which the counter-blocking means is formed. Owing to the stiffened configuration of the rear first region of the secondary locking element, the axial portion of the isolator element in which the counter-blocking means is formed is not able to be moved laterally or radially outward.

The two lateral walls of the rear first region of the secondary locking element, which are formed to be mutually opposite, are in each case lengthened in the adjoining front second region. The third or fourth lateral wall cannot be lengthened in the front second region, so that the two lateral walls of the front second region of the secondary locking element, which are disposed so as to be mutually opposite, are not connected to one another and in this way have a certain degree of elasticity. The elasticity of the two lateral walls of the front second region of the secondary locking element, which are formed so as to be mutually opposite, can be additionally increased in the front second region, for example as a result of a configuration of longitudinal slots, of feedthroughs, or of clearances in the plug-in direction of the secondary locking element, or as a result of a reduction of the wall thickness of the lateral walls.

Instead of an elastic configuration of the two lateral walls in the front second region of the secondary locking element, which are in each case configured to be mutually opposite, in an alternative variant the two lateral walls in the front second region, which are configured to be mutually opposite, can have a larger spacing than the two lateral walls in the rear first region, which are configured to be mutually opposite. Owing to the larger spacing, the two lateral walls in the rear first region of the secondary locking element, which are configured to be mutually opposite, are also laterally spaced apart from the mutually opposite external faces of the isolator element in the event of a secondary locking element situated in the terminal latching position.

The two mutually opposite lateral walls of the front second region of the secondary locking element, in the preliminary latching position of the secondary locking element, are in each case laterally adjacent to an axial portion of two mutually opposite lateral walls of the isolator element in which the counter-blocking means is formed. Owing to the elastic configuration of the two lateral walls in the front first region, which are configured to be mutually opposite, or alternatively owing to the lateral spacing of the two lateral walls in the front first region, which are configured to be mutually opposite, from the external faces of the isolator element, and the elastic development of the isolator element, the spacing between the mutually opposite regions of the internal face of the isolator element is variable. In the preliminary latching position of the secondary locking element it is thus possible for the blocking means and the associated counter-blocking means to transition between a blocked state and an unblocked state.

In order to position and to fix the secondary locking element in the preliminary latching position, or alternatively in the terminal latching position, in a preferred development of the secondary locking element, at least one latching formation which with an associated counter-latching formation is in each case able to be latched or released in a preliminary latching position and in a terminal latching position on the external face of the isolator element, or on the internal face of the outer conductor contact element or of the plug connector housing, respectively, can be formed on an inner casing face or on an outer casing face of the secondary locking element.

The latching formation which is in each case formed on the inner casing face or on the outer casing face of the secondary locking element can preferably be formed as a web, for example, as a latching cam, or as a latching hook, or as a latching protrusion. The associated counter-latching formation which is in each case formed on the external face of the isolator element, or on the internal face of the outer conductor contact element or of the plug connector housing can in each case be shaped, for example, as a latching clearance, or as a latching recess. Alternatively, the counter-latching formations on the external face of the isolator element, or on the internal face of the outer conductor contact element or of the plug connector housing, respectively, can in each case be formed as a web or as a latching protrusion, and the associated latching formations on the secondary locking element can be formed, for example, as a latching clearance or as a latching recess.

The latching formations on the inner casing face or on the outer casing face of the secondary locking element are preferably in each case configured to be elastic, and the associated counter-latching formations on the external face of the isolator element or on the internal face of the outer conductor contact element or of the plug connector housing, respectively, are configured to be rigid.

Alternatively, the latching formations on the inner casing face or on the outer casing face of the secondary locking element for the preliminary latching and the terminal latching can in each case be configured to be rigid, and the associated counter-latching formations on the internal face of the outer conductor contact element or of the plug connector housing can be configured to be elastic, for example by integrally molding a latching hook, or punching out the latter.

In the case of a straight plug connector, the latching formations on the inner casing face or on the outer casing face of the secondary locking element for the preliminary latching and the terminal latching can in each case be configured to be rigid, and the associated counter-latching formations on the external face of the isolator element can be configured to be elastic if the individual counter-latching formations on the external face of the isolator element can be implemented outside the axial portion of the isolator element in which the counter-latching means is formed on the internal face.

For the avoidance of slitting the isolator element, in a manner analogous to forming the primary locking mechanism, the counter-latching formation can for this purpose likewise be formed in an axial portion of the isolator element which has a dimensionally elastic cross-sectional profile. Moreover, the counter-latching formation can be formed as a web which extends in a circumferential direction perpendicular to the longitudinal axis of the plug connector solely within a segment. In terms of the parameterization of the counter-latching formation on the external face of the isolator element, which is formed as a web, the parametrizations already mentioned pertaining to the counter-blocking means on the internal face of the isolator element, which is formed as a web, apply in an equivalent manner.

The counter-latching formations for the preliminary latching and the terminal latching on the external face of the isolator element, or on the internal face of the outer conductor contact element or of the plug connector housing, in the case of a straight plug connector can preferably be formed so as to be completely encircling in a circumferential direction orthogonal to the longitudinal axis of the plug connector. The associated latching formations on the secondary locking element, which are formed as a latching cam or a latching hook, for example, extend in a direction orthogonal to the longitudinal axis of the plug connector solely in a segment.

If the latching formations as well as the associated counter-latching formations extend in each case in a direction orthogonal to the longitudinal axis of the plug connector solely in a segment and are implemented in each case as webs, for example as latching cams or as latching hooks, the secondary locking element can easily slide out of the preliminary latching position and/or the terminal latching position and be removed axially from the plug connector by a simple rotational movement.

In order to prevent this, an anti-rotation safeguard between the secondary locking element and the isolator element is preferably to be formed by way of an interaction of a locking means formed on the inner casing face of the secondary locking element and a counter-locking means formed on the external face of the isolator element. In an equivalent manner, an anti-rotation safeguard between the secondary locking element and the outer conductor contact element, or the plug connector housing, respectively, is to be formed by way of an interaction of a locking means formed on the outer casing face of the secondary locking element and a counter-locking means formed on the internal face of the outer conductor contact element, or of the plug connector housing, respectively. The pair consisting of the locking element and the counter-locking element can be formed, for example, as a combination of a rib-shaped web and a groove-shaped depression, the longitudinal extent of said web and groove running in the longitudinal axial direction of the plug connector.

Alternatively, in an angled plug connector, a secondary locking element can also be embodied as an independent secondary locking (ISL) element. In this case, the secondary locking element can preferably be shaped in the form of a clip, i.e. in particular so as to be C-shaped, and in this way be elastically configured. Each of the two arms of the clip can in each case be preferably embodied in a bifurcated manner, so that the independent secondary locking element in the plugged state, by way of the two bifurcated arms, encompasses in each case one of the two lateral walls of the isolator element which are disposed so as to be mutually opposite. Owing to the elasticity of the two bifurcated arms of the secondary locking element, the secondary locking element is fixed on both lateral walls of the isolator element which are disposed so as to be mutually opposite. Latching means which are in each case additionally formed on the bifurcated arms and are able to be latched to associated counter-latching means formed in each case on the lateral walls of the isolator element, can improve the fixing action. The clip-shaped secondary locking element is inserted into the isolator element at a lateral end of the lateral opening formed on the isolator element, preferably at the cable-proximal lateral end. In the plugged state, the independent secondary locking element prevents an enlargement of the spacing between the two mutually opposite lateral walls of the isolator element, thus that the latching connection between the inner conductor contact element, which is preferably formed as a flat contact, and the isolator element is released. Alternatively, the clip-shaped secondary locking element by way of both arms can in each case be insertable into a lateral groove of the inner conductor contact element, thus preventing an axial displacement of the inner conductor contact element.

Alternatively, the independent secondary locking element can also be configured in the shape of a plate and, at a rear end of the secondary locking element in the plug-in direction, have in each case two elevations disposed in parallel, having in each case one latching means directed toward the front end of the secondary locking element. An independent secondary locking element shaped in this manner, can preferably be inserted into the plug connector at the frontal end of the plug connector, between the outer conductor contact element and the frontal end of the isolator element. Fixing of the secondary locking element can be implementable, for example, by way of at least one latching formation which is formed on the inside or the outside on the plate-shaped secondary locking element and is able to latch in each case into an associated counter-latching formation formed on the isolator element, or in the outer conductor contact element, or in the plug connector housing, respectively. The latching means of the two protrusions of the plate-shaped secondary locking element latch to an associated counter-latching means which can in each case be formed on the lateral ends of the preferably U-shaped inner conductor contact element. An axial or lateral movement of the inner conductor contact element in the isolator element, and thus a release of the latching connection between the inner conductor contact element and the isolator element, can be prevented in this way.

If only one web with a minor radial or lateral extent can be implemented in each case on the internal face of the isolator element or on the external face of the inner conductor contact element for reasons of production technology, a web which is in each case formed on the isolator element, or on the inner conductor contact element, respectively, is indeed able to be inserted in a groove, or at a recess of the inner conductor contact element, or of the isolator element, respectively, in the blocked state. However, owing to the minor radial or lateral extent, in the blocked state the web will not reach the deepest region of the groove, or of the recess, respectively, and the blocking mechanism, or the latching mechanism, between the blocking means and the counter-blocking means will be released, for instance owing to an excessively low blocking or latching effect. In order for this to be prevented, the following technical measure may be implemented in a further preferred development of the invention:

For this purpose, the secondary locking element in the blocked state not only performs locking of the blocking mechanism between the blocking means and the counter-blocking means, but also an elastic deformation of the axial portion of the isolator element in which the counter-latching element is formed. The elastic deformation herein is carried out in such a manner that the web in a direction lateral or radial to the longitudinal axial direction of the plug connector contacts in each case the deepest region of an associated groove, or of an associated recess without gap. In this way, the web completely fills the associated groove, or the associated recess, and enables optimal blocking or latching between the blocking means and the counter-blocking means.

In a first development of the invention, in which the counter-blocking means is formed as a web on the internal face of the isolator element, the secondary locking element elastically deforms the axial portion of the isolator element in which the counter-blocking means is formed in such a manner that the counter-blocking means formed as a web in a direction radial or lateral to the longitudinal axis of the plug connector contacts a deepest region of the blocking means without gap. In a second development of the invention, in which the blocking means is formed as a web on the external face of the inner conductor contact element, the secondary locking element elastically deforms the axial portion of the isolator element in which the counter-blocking means is formed in such a manner that the blocking means formed as a web in a direction radial or lateral to the longitudinal axis of the plug connector contacts a deepest region of the counter-blocking means without gap.

In order to cause the elastic deformation of the isolator element, the internal face of the secondary locking element in the blocked state is not only laterally or radially adjacent to the external face of the isolator element, but presses laterally or radially into the external face of the elastically configured axial portion of the isolator element, displacing the elastic material of the isolator element in the lateral or radial direction so as to close a gap between the web and the associated depression. For this purpose, the spacing between two mutually opposite regions of the internal face of the secondary locking means is smaller than the spacing between two mutually opposite external faces of the elastically configured axial portion of the isolator element in which the counter-blocking means is formed. In the process, the two mutually opposite regions of the internal face of the secondary locking means in the terminal latching position of the secondary locking element are laterally or radially adjacent to the two mutually opposite external faces of the elastically configured axial portion of the isolator element in which the counter-blocking means is formed.

In order to ensure reliable blocking between the blocking means and the counter-blocking means even in the event of production tolerances of the isolator element and the inner conductor contact element, the spacing between the two mutually opposite regions of the internal face of the secondary locking elements, which in the terminal latching position are laterally or radially adjacent to the axial portion of the isolator element in which the counter-blocking means is formed, is to be configured sufficiently small.

In order to be able to fill the gap between the blocking means and the counter-blocking means with an elastic material of the isolator element in the blocked state, in a further preferable development of the invention, the axial portion of the isolator element in which the counter-blocking means is formed has a larger external diameter than the respective neighboring axial portions of the isolator element.

As has already been described above, in a preferred development of the invention a plurality of webs, preferably in each case two webs which are mutually opposite relative to the longitudinal axis of the plug connector, can in each case be formed on the external face or on the internal face, in order to improve the fixing of the inner conductor contact element on the isolator element.

When a plurality of webs are formed on the isolator element, or alternatively on the inner conductor contact element, a number of grooves or recesses corresponding to the number of webs on the inner conductor contact element, or on the isolator element, is to be formed. Alternatively, an encircling depression can also be formed on the inner conductor contact element, or on the isolator element.

The invention also comprises an electrical plug connection consisting of an electrical plug connector and a corresponding electrical mating plug connector.

The technical aspects which have already been described and are described hereunder pertaining to the electrical plug connector also apply in an equivalent manner to the electrical plug connection and vice versa.

The above designs and developments can be combined with one other as desired if expedient. Further potential design embodiments, refinements and implementations of the invention also include combinations of features of the invention that are not explicitly mentioned above or described below with regard to the exemplary embodiments. In particular, the person skilled in the art will also add individual aspects as improvements or additions to the respective basic form of the present invention.

BRIEF DESCRIPTION OF THE DRAWING

The present invention will be explained in more detail hereunder by means of the exemplary embodiments set forth in the schematic figures of the drawing. In the figures.

Figure 1A:
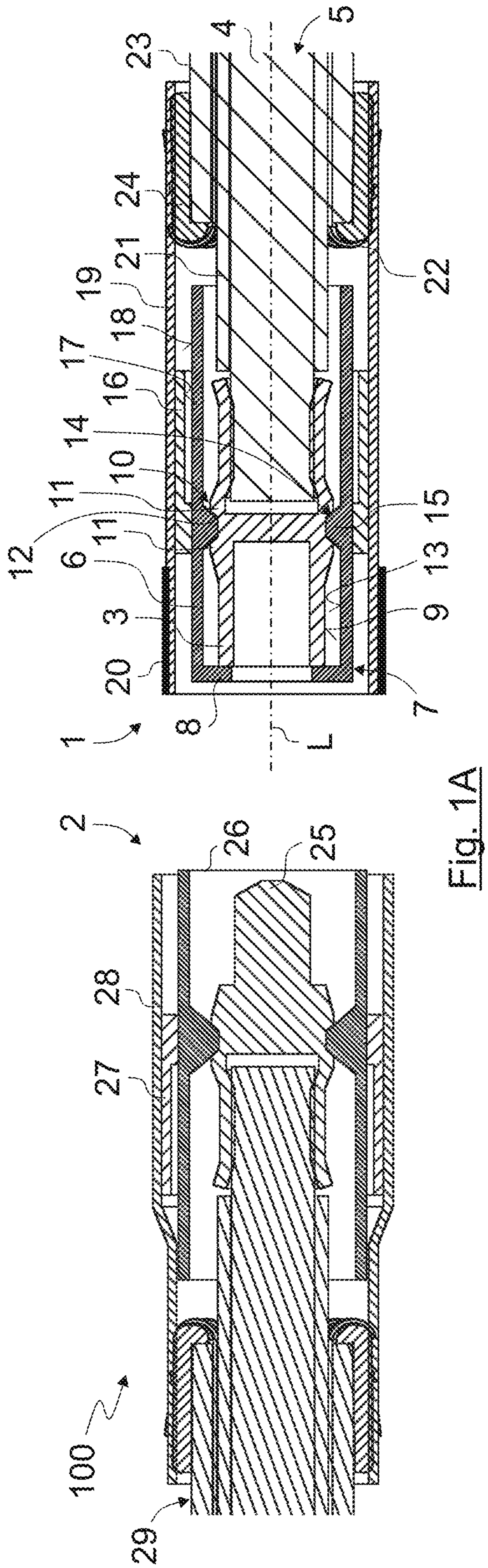
FIGS. 1A,1B show a cross-sectional illustration of the plug connection according to the invention in the unplugged state and in the plugged state.

The appended figures of the drawing are intended to impart better understanding of the embodiments of the invention. Said figures visualize embodiments and in conjunction with the description serve to explain principles and concepts of the invention. Other embodiments and many of the advantages mentioned are derived from perusing the drawings. The elements of the drawings are not necessarily shown true to scale relative to one another.

In the figures of the drawing, elements, features and components that are the same, have the same function and have the same effect—unless stated otherwise—are each provided with the same reference signs.

The figures are described cohesively and comprehensively hereunder.

DESCRIPTION OF EXEMPLARY EMBODIMENTS

The electrical plug connection 100 consisting of an electrical plug connector 1 and an associated electrical mating plug connector 2 in the unplugged state will be explained hereunder by means of FIG. 1A, and in the plugged state by means of FIG. 1B:

The electrical plug connector 1 in the prepared state has an inner conductor contact element 3 which is electrically and mechanically connected to the inner conductor 4 of a coaxial cable 5 by way of a crimp connection, for example. The inner conductor contact element 3 in the example illustrated is configured to be sleeve-shaped. The inner conductor contact element 3 is encased, preferably in the manner of a sleeve, by an isolator element 6. An encircling web 8, which is directed radially inward and serves as a touch protection for the inner conductor contact element 3, is formed on the plug-proximal end 7 on the isolator element 6.

A blocking means 10, which in the example illustrated comprises two webs 11 which are axially spaced apart and preferably formed in an encircling manner, having an encircling groove 12 formed therebetween, is formed on the external face 9 of the inner conductor contact element 3. In the blocked state of the plug connector 1, the blocking means 10 of the inner conductor contact element 3 is blocked in terms of its axial movement by a counter-blocking means 14 formed on the internal face 13 of the isolator element 6. In this way, the inner conductor contact element 3 is also blocked along a longitudinal axis L of the plug connector 1 to the isolator element 6. According to FIGS. 2A, 2C and 2E, the counter-blocking means 14 has, for example, two webs 15 which are formed on radially mutually opposite regions of the internal face 13 of the isolator element 6, and are in each case inserted or latched into the groove 12 of the blocking means 10 formed in the inner conductor contact element 3. The webs 15 of the counter-blocking means 14 are in each case formed in a direction perpendicular to the orientation of the longitudinal axis L solely within a segment on the internal face 13 of the isolator element 6. The isolator element 6 has a dimensionally elastic cross-sectional profile at least in the axial portion of the counter-blocking means 14.

The isolator element 6 is encased by a preferably sleeve-shaped secondary locking element 16 at least in an axial portion. In the exemplary illustration, the secondary locking element 16, in an axial portion which in the assembled state is radially adjacent to the axial portion of the isolator element 6 in which the counter-blocking means 14 is formed, has an internal face 17, the diameter of the latter corresponding to the diameter of the outer casing face 18 of the isolator element 6. The blocking of the blocking means 10 and of the counter-blocking means 14 by the secondary locking element 16 is ensured in this way. The secondary locking element 16 is finally enclosed by an outer conductor contact element 19. A contact sleeve 20, the contact leaves of the latter contacting the associated outer conductor mating contact element 28 of the mating plug connector 2, is fixed on the external circumference of the outer conductor contact element 19, for example.

In the customary coaxial construction mode, the cable 5 has an isolator 21 which encloses the inner conductor 4. An outer conductor shield 22 which encases the isolator 21 is in turn enclosed by a cable casing 23, and on its plug-proximal end is exposed by the cable casing 23. The exposed outer conductor shield 22 is folded back about a support sleeve 24 which is attached to the outer conductor shield 22 and/or to the cable casing 23. The outer conductor shield 22, which is folded back on the support sleeve 24, on the inside is electrically and mechanically connected to the outer conductor contact element 19 by way of a customary crimp connection.

The associated mating plug connector 2 correspondingly has an inner conductor mating contact element 25 which is formed in the shape of a pin and is enclosed by an isolator element 26. The blocking or latching of the inner conductor mating contact element 25 with the isolator element 26 of the mating plug connector 2 takes place in a manner equivalent to the latching of the inner conductor contact element 3 with the isolator element 6 in the plug connector 1, by way of a blocking means formed on the inner conductor mating contact element 25 and an associated counter-blocking means formed on the isolator element 26. Locking of the blocking mechanism or latching mechanism between the blocking means and the associated counter-blocking means takes place in a manner equivalent to the secondary locking in the plug connector 1 by way of a secondary locking element 27 which is disposed between the outer conductor mating contact element 28 and the isolator element 26 of the mating plug connector 2. The preparation of the cable 29 with its individual elements on the associated elements of the mating plug connector 2 takes place in a customary manner and in a manner equivalent to the preparation of the cable 5 on the plug connector 1.

Figure 1B:
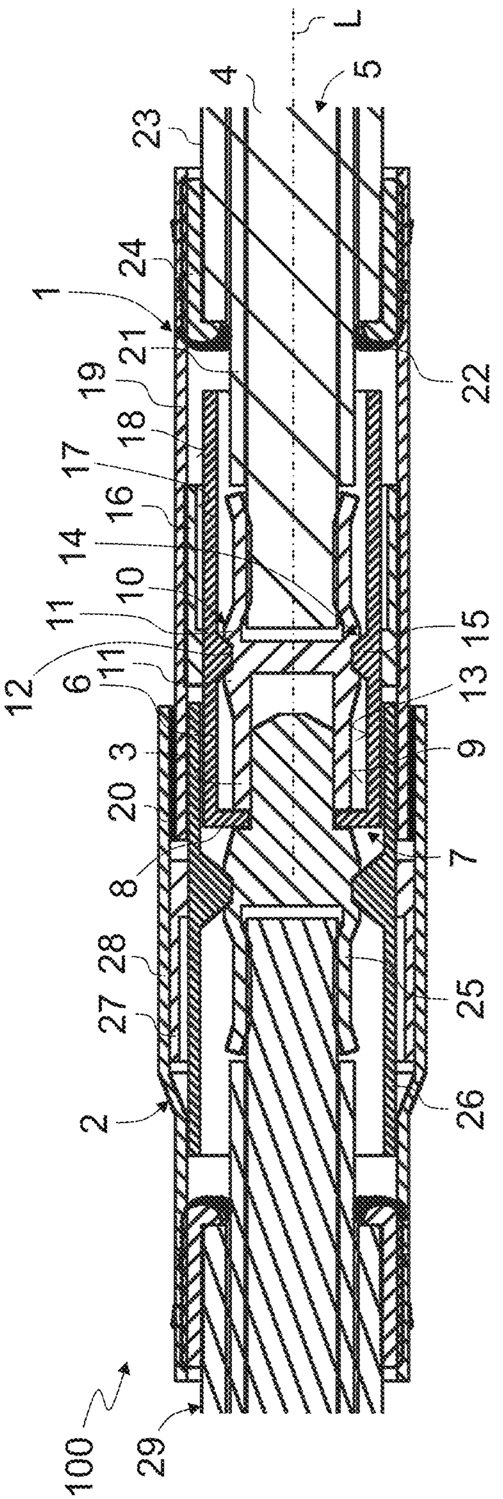

In the plugged state of the plug connection 100 according to FIG. 1B, the external face of the pin-shaped inner conductor mating contact element 25 contacts the internal face of the sleeve-shaped inner conductor contact element 3. The isolator element 26 of the mating plug connector 2 is inserted between the isolator element 6 and the outer conductor contact element 19 of the plug connector 1. The outer conductor mating contact element 28 of the mating plug connector 2 contacts the contact sleeve 20 of the outer conductor contact element 19 of the plug connector 1.

The assembly procedure of an inner conductor contact element 3 in an isolator element 6 is illustrated in three sequential steps in FIGS. 2A to 2F, in each case in a cross-sectional illustration and a longitudinal sectional illustration of a partial fragment of a straight plug connector 1 having a rotationally symmetrical inner conductor contact element 3 (round contact):

In the first embodiment of a plug connector 1 according to the invention having a rotationally symmetrical inner conductor contact element 3 illustrated here, a web 15 is in each case formed in respective mutually opposite regions of the internal face 13 of the isolator element 6, said webs 15 forming the counter-blocking means 14. The individual web 15 is formed in a direction perpendicular to the orientation of the longitudinal axis L solely within a segment 30 which in a straight plug connector 1 having a rotationally symmetrical cross-sectional profile represents an angular segment 30. The two angular segments 30 in FIG. 2A are in each case delimited by the two dashed lines and denoted by the angle (P.

Figure 2A:
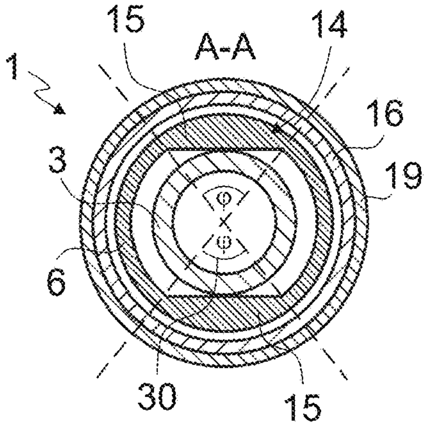
FIGS. 2A to 2F show a sequence of cross-sectional and longitudinal sectional illustrations during the plug-in procedure of a round inner conductor contact element into an isolator element of a first embodiment of a straight plug connector according to the invention.
Figure 2B:
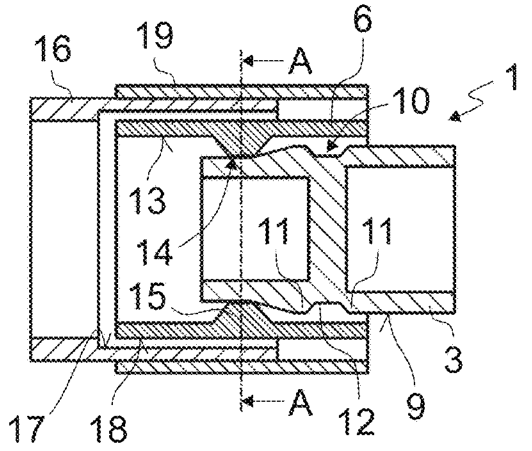
Figure 2C:
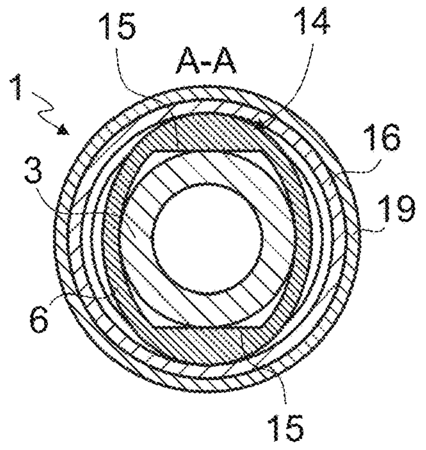
Figure 2D:
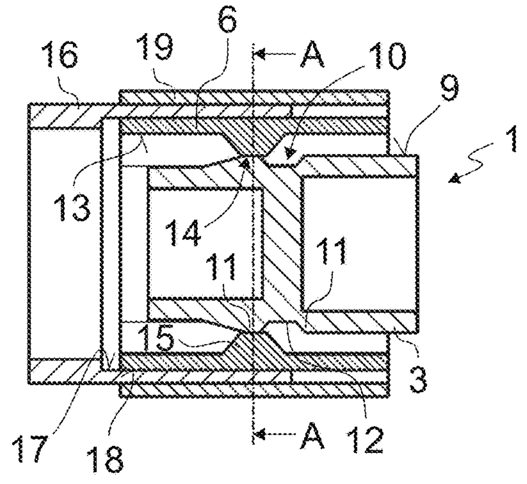

In FIGS. 2A and 2B, the counter-blocking means 14 of the isolator element 6 is axially spaced apart from the blocking means 10 of the inner conductor contact element 3. The blocking means 10 and the counter-blocking means 14 are in an unblocked state. The cross-sectional profile of the isolator element 6 in the axial portion of the counter-blocking means 14 is circular and thus not yet deflected. The spacing between the two webs 15 of the counter-blocking means 14 is minimal in this first stage of the assembly procedure, and is thus reduced in comparison to the spacing between the two webs 15 in the next second stage of the assembly procedure, which is illustrated in FIGS. 2C and 2D.

When the inner conductor contact element 3 is moved onward axially, the two webs 15 of the counter-blocking means 14 in a second stage of the assembly procedure are thus located on a first web 11 of the blocking means 10. The blocking means 10 and the counter-blocking means 14 continue to be in an unblocked state. Owing to the dimensionally elastic cross-sectional profile in the axial portion of the isolator element 6 in which the counter-blocking means 14 is formed, the spacing between the two webs 15 of the counter-blocking means 14 is enlarged. Said spacing adapts to the enlarged spacing between the two radially mutually opposite webs 11 of the blocking means 10. This results in an elliptic cross-sectional profile of the isolator element 6 in the axial portion of the counter-blocking means 14.

Figure 2E:
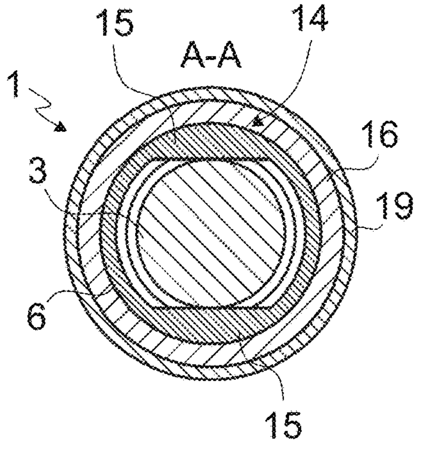
Figure 2F:
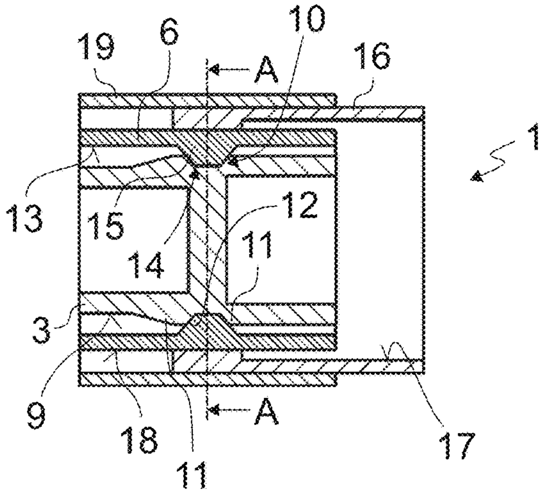

By further displacing the inner conductor contact element 3 axially in the isolator element 6, the inner conductor contact element 3 in a third stage of the assembly procedure makes its way to a blocked state of the blocking means 10 and of the counter-blocking means 14 according to FIGS. 2E and 2F. The two webs 15 of the counter-blocking means 14 are inserted in the groove 12 between the two webs 11 of the blocking means 10. The spacing between the two webs 15 of the counter-blocking means 14 in the blocked state of the third stage of the assembly procedure is reduced again in comparison in comparison to the unblocked state in the second stage of the assembly procedure. The elastic cross-sectional profile of the isolator element 6 reassumes a circular cross-sectional profile, in a manner analogous to the first assembly step according to FIGS. 2A and 2B. The blocked state of the blocking means 10 and of the counter-blocking means 14 is secured by the secondary locking element 16, the internal face 17 thereof being directly radially adjacent to the outer casing face 18 of the isolator element 6 in the region of the counter-blocking means 14.

Figure 3A:
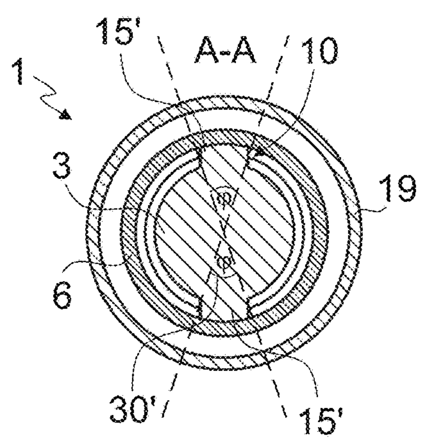
FIGS. 3A to 3F show a sequence of cross-sectional and longitudinal sectional illustrations during the plug-in procedure of a round inner conductor contact element into an isolator element of a second embodiment of a straight plug connector according to the invention.
Figure 3B:
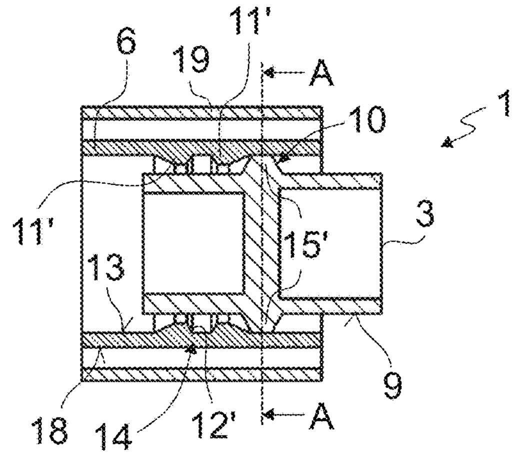
Figure 3C:
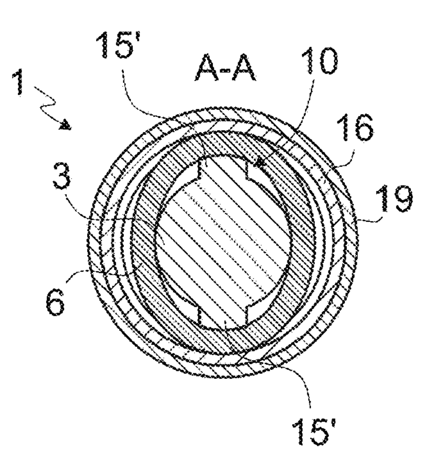
Figure 3D:
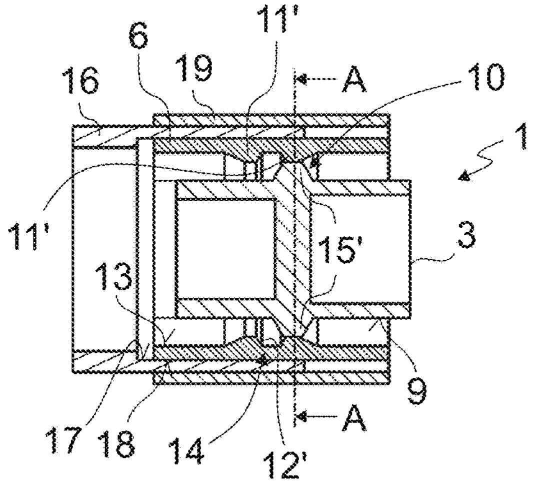
Figure 3E:
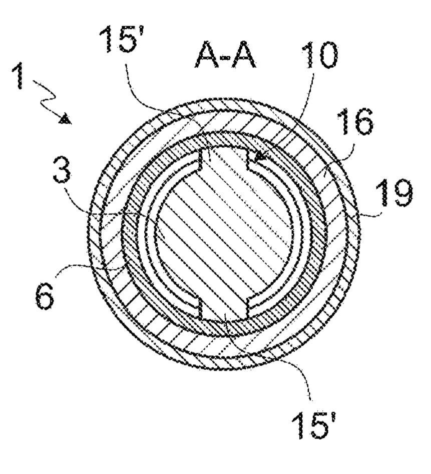
Figure 3F:
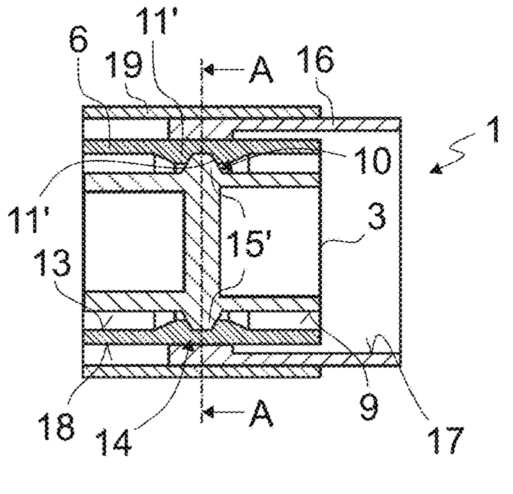

Illustrated in FIGS. 3A to 3F is a three-stage assembly process of a second embodiment of a straight plug connector 1 according to the invention, having a rotationally symmetrical inner conductor contact element 3. In the second embodiment, the configuration of the blocking means 10 and of the counter-blocking means 14 is implemented inversely to the first embodiment:

A web 15' of the blocking means 10 is in each case formed in two regions of the external face 9 of the inner conductor contact element 3 that are disposed so as to be radially mutually opposite. As is illustrated in FIG. 3A, the individual web 15' is formed in a direction perpendicular to the orientation of the longitudinal axis L solely in a segment 30' of the external face 9. The counter-blocking means 14 has two axially spaced apart webs 11' and a groove 12' located therebetween. The two webs 11' and the groove 12' located therebetween are preferably in each case formed so as to be completely encircling.

The two radially mutually opposite regions in the elastic axial portion of the isolator element 6, in which the counter-blocking means 14 is formed and which in the blocked state is radially adjacent to the two webs 15' of the inner conductor contact element 3, are variable in terms of their spacing. The spacing between the two radially mutually opposite regions of the isolator element 6 in which the counter-blocking means 14 is formed is enlarged in the second stage of the assembly process according to FIGS. 3C and 3D. The elastic cross-sectional profile of the isolator element 6 is thus deformed elliptically so that the inner conductor contact element 3 having the two webs 15' is axially displaceable within one of the two webs 11' of the counter-blocking means 14. In the first and the third stage of the assembly process according to FIGS. 3A and 3B, or 3E and 3F, respectively, the spacing between the radially mutually opposite regions of the isolator element 6 in which the counter-blocking means 14 is formed is reduced in comparison to the spacing in the second stage according to FIGS. 3C and 3D. The elastic cross-sectional profile of the isolator element 6 in the first and the third stage of the assembly process is thus of a circular shape.

Figure 4C:
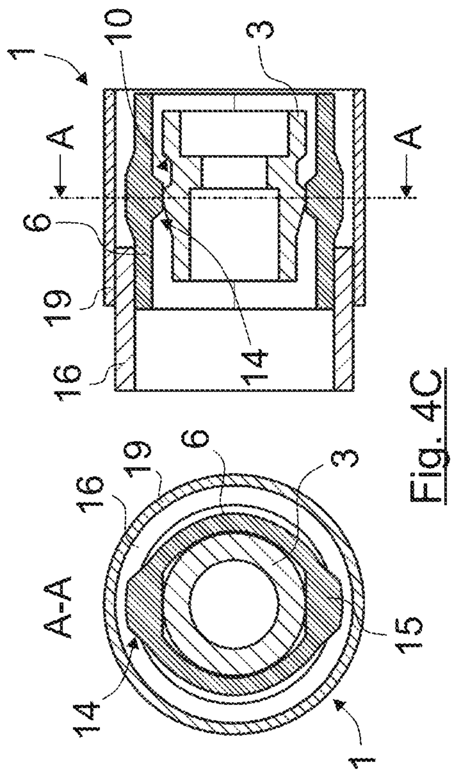
FIGS. 4A to 4D show a sequence of cross-sectional and longitudinal sectional illustrations during the plug-in procedure of a round inner conductor contact element into an isolator element of a third embodiment of a straight plug connector according to the invention.
Figure 4D:
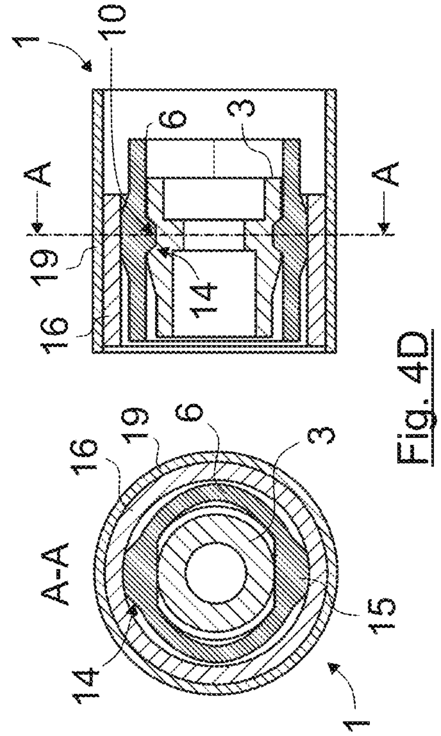
Figure 4A:
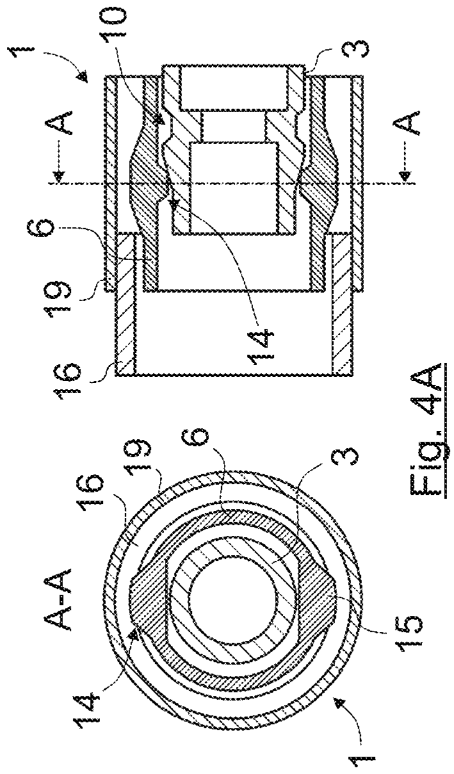
Figure 4B:
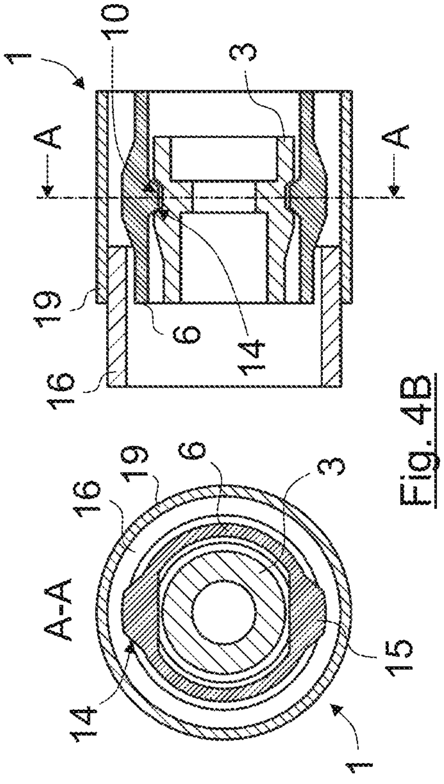

Illustrated in FIGS. 4A to 4D is a four-stage assembly process of a third embodiment of a plug connector 1 according to the invention, having a rotationally symmetrical inner conductor contact element 3:

The first three assembly steps in FIGS. 4A to 4C of the third embodiment correspond to the three assembly steps of the first embodiment in FIGS. 2A to 2C. It can be seen from FIG. 4C that the radial extent of the two webs 15 of the counter-blocking means 14 in the isolator element 6 is shortened for production reasons, this resulting in a gap between the individual web 15 in the counter-blocking means 14 of the isolator element 6 and the groove 12 in the blocking means 10 of the inner conductor contact element 3. In order to close the gaps, the isolator element 6 in the axial portion of the counter-blocking means 14 has a larger external diameter than in the neighboring axial portions of the isolator element 6. By inserting the secondary locking element 16 into the intermediate space between the outer conductor contact element 19 and the isolator element 6 in the fourth assembly step according to FIG. 4D, the elastic material in the widened axial portion of the isolator element 6 is pressed into the gap by the radially adjacent portion of the secondary locking element 16, so as to close said gap.

Figure 5A:
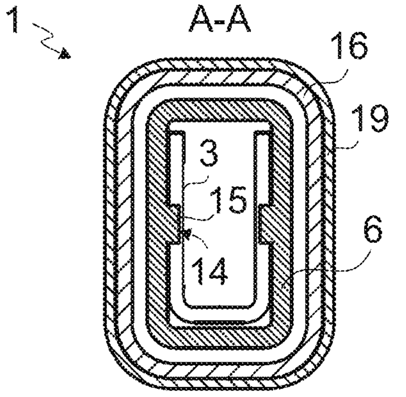
FIGS. 5A to 5F show a sequence of cross-sectional and longitudinal sectional illustrations during the plug-in procedure of a flat inner conductor contact element into an isolator element of a straight plug connector according to the invention.
Figure 5B:
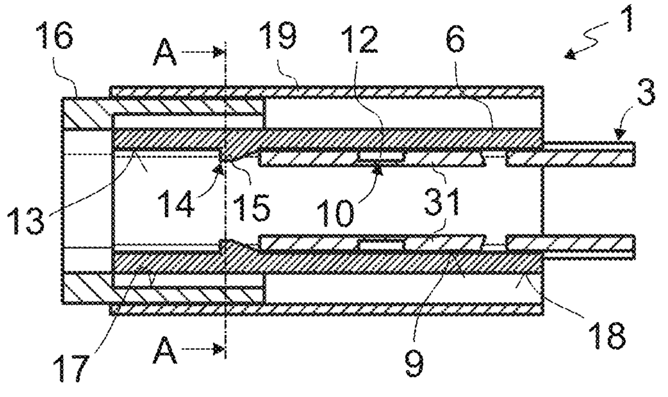
Figure 5C:
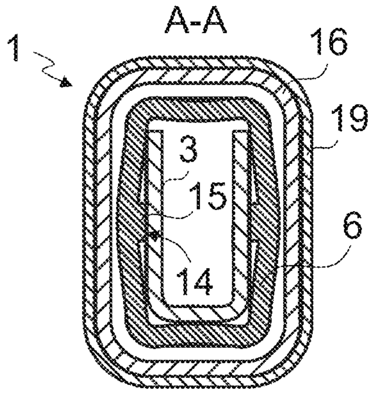
Figure 5D:
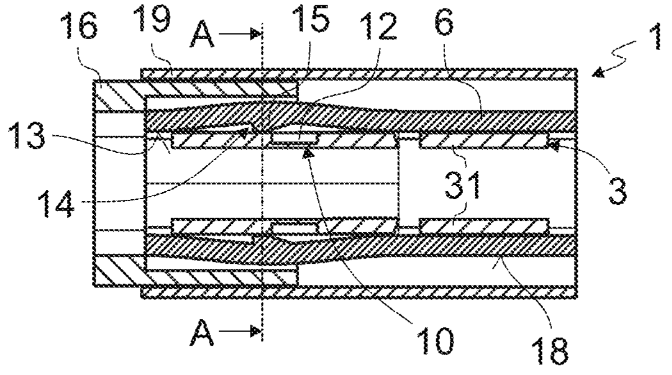
Figure 5E:
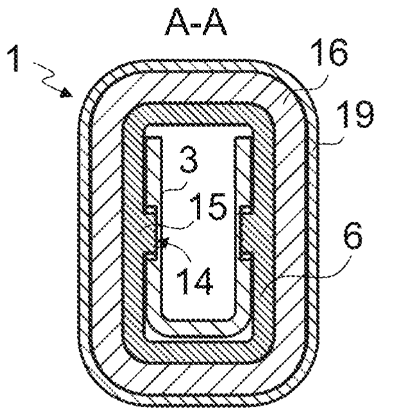
Figure 5F:
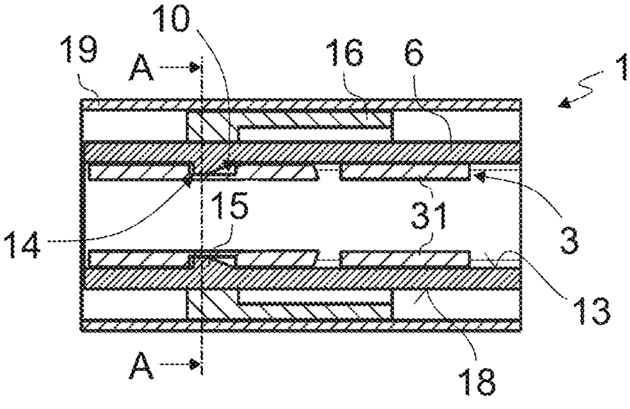

A three-stage assembly process of a plug connector 1 according to the invention, having an inner conductor contact element 3 which is formed as a flat contact, and in particular as a U-shaped flat contact, is derived from FIGS. 5A to 5E:

The isolator element 6, the secondary locking element 16 and the outer conductor contact element 19 in an inner conductor contact element formed as a flat contact, as is derived from the figures, have in each case a rectangular cross-sectional profile. The blocking means 10 of the inner conductor contact element 3 is formed in each case by a groove 12 on the external face 9 of the laterally mutually opposite lateral walls 31 of the inner conductor contact element 3. The counter-blocking means 14 of the isolator element 6 is correspondingly formed in each case by a web 15 on laterally mutually opposite regions of the internal face 13 of the isolator element 6. In order to be able to move the inner conductor contact element 3 axially within the webs 15, which are formed so as to be mutually opposite, during the assembly procedure, the rectangular cross-sectional profile in the axial portion of the isolator element 6 in which the counter-blocking means 14 is formed, is variable. The spacing between the two webs 15, in the horizontal direction illustrated in FIG. 5C, is enlarged, while the spacing between the respective mutually opposite regions of the isolator element 6 is reduced in a direction perpendicular to the former, in the vertical direction illustrated in FIG. 5C. The webs 15 are blocked or latched in the associated grooves 12 in the blocked state of the blocking means 10 and of the counter-blocking means 14 according to FIGS. 5E and 5F. The spacing between the two webs 15 is reduced again.

Figure 6:
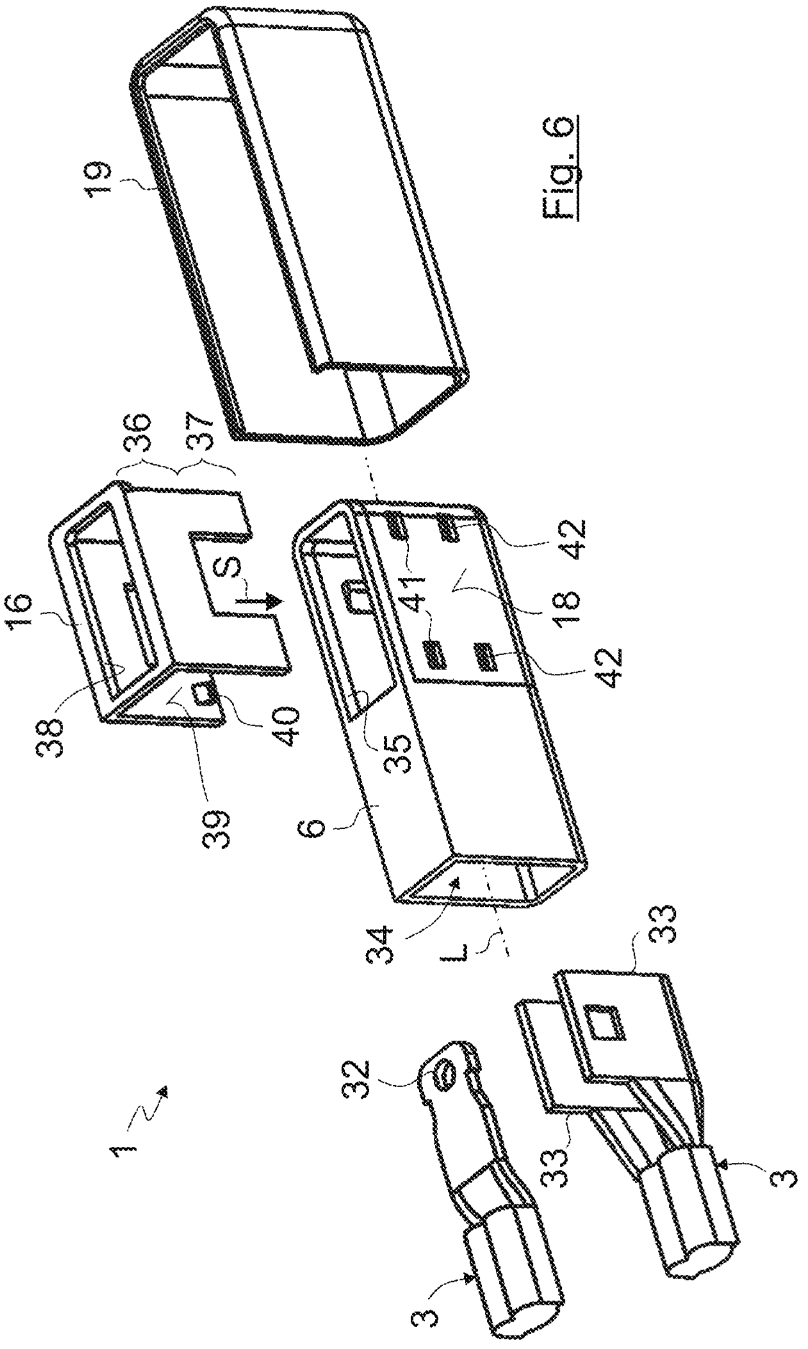
FIG. 6 shows an exploded illustration of an angled plug connector according to the invention.
Figure 7A:
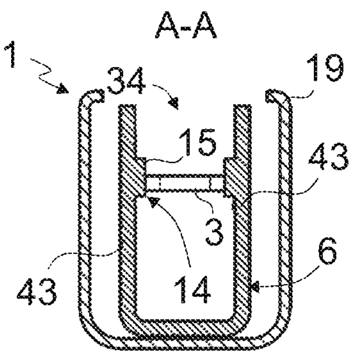
FIGS. 7A to 7F show a sequence of cross-sectional and longitudinal sectional illustrations during the plug-in procedure of an inner conductor contact element into an isolator element of an angled plug connector according to the invention.
Figure 7B:
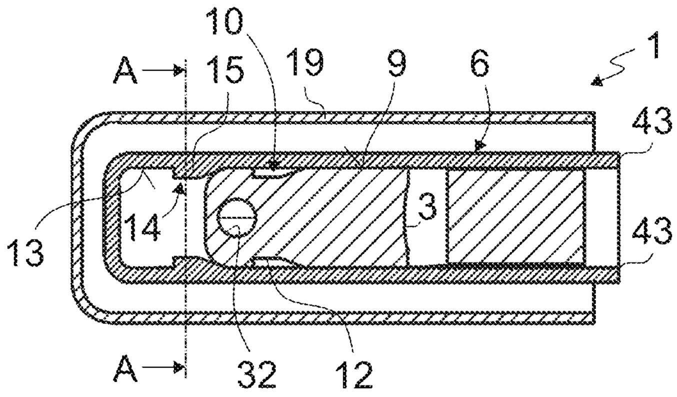
Figure 7C:
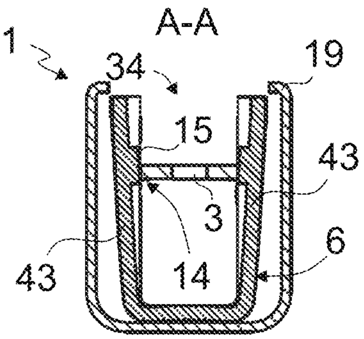
Figure 7D:
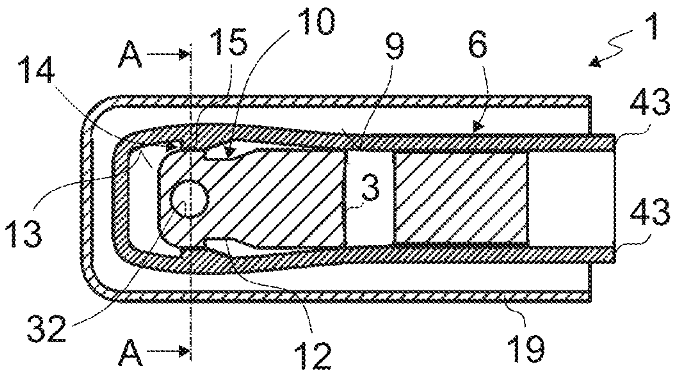
Figure 7E:
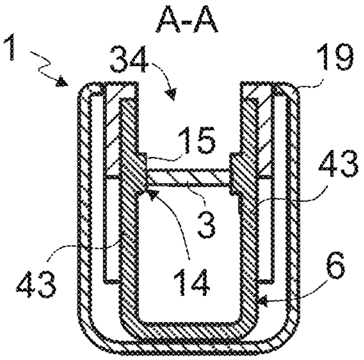
Figure 7F:
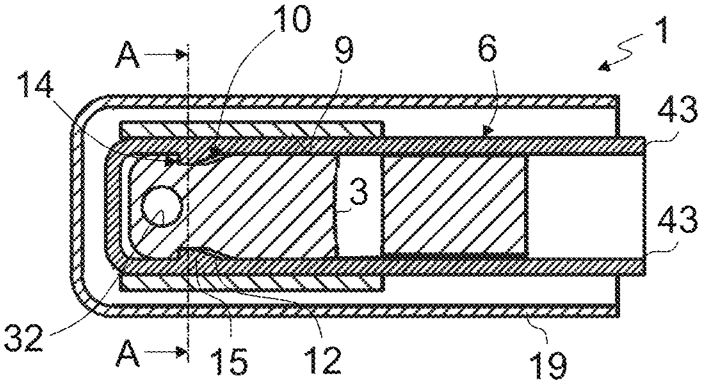

An exploded illustration of an angled plug connector 1 according to the invention, having an inner conductor contact element 3, is derived from FIG. 6:

The inner conductor contact element 3 for an angled plug connector is preferably formed as a flat contact. In a first development, the flat contact can be formed as a cable shoe (upper illustration of the inner conductor contact element 3 in FIG. 6) which preferably has a bore 32 for contacting an inner conductor mating contact element 25 of a mating plug connector 2, which is configured in the shape of a pin. In an alternative second development, the flat contact can be formed as a U-shaped flat contact (lower illustration of the inner conductor contact element 3 in FIG. 6), the inner conductor mating contact element 25 of the mating plug connector 2, configured as a contact blade, being able to be inserted for contacting between the flanges 33 of said flat contact.

The isolator element 6 is shaped in the manner of a sleeve and in the direction of the longitudinal axis L of the plug connector 1 has a first opening 34 for inserting the inner conductor contact element 3. Moreover formed in the isolator element 6, in a direction perpendicular to the orientation of the longitudinal axis L, is a second opening 35 for contacting the inner conductor contact element 3 with an associated inner conductor mating contact element 25 of a mating plug connector 2. The isolator element 6 is inserted in an outer conductor contact element 19 which is either shaped in the manner of a tray, as illustrated in FIG. 6, or in the manner of a sleeve, equivalent to the shape of the isolator element 6, and has a first and a second opening.

The secondary locking element 16 is substantially sleeve-shaped and in the plugging direction S has a rear first region 36 which is formed in a stiffened manner from three lateral walls, and an adjoining front second region 37 which is formed in an elastic manner from two lateral walls which are formed so as to be mutually opposite and are preferably slotted in order for the elasticity to be increased. An opening 38 for contacting the inner conductor contact element 3 with an associated inner conductor mating contact element 25 is formed at the rear end of the secondary locking element 16 in the plugging direction S.

Latching formations 40, preferably latching hooks, for fixing the secondary locking element 16 in a preliminary latching position and a terminal latching position, which are in each case able to be latched to associated counter-latching formations 41 in the preliminary latching position, and to associated counter-latching formations 42 in the terminal latching position, are preferably formed on the inner casing face 39 of the secondary locking element 16 in a front end region in the plugging direction S. The counter-latching formations 41 and 42 are preferably formed as latching clearances at associated positions on the outer casing face 18 of the isolator element 6.

A three-stage assembly procedure of an inner conductor contact element 3, which is formed as a cable shoe, for in each case one angled plug connector 1 is illustrated in FIGS. 7A to 7F. A three-stage assembly procedure of an inner conductor contact element 3, which is formed as a U-shaped flat contact, is performed in an equivalent manner.

The isolator element 6, the secondary locking element 16 and the outer conductor contact element 19 have in each case a U-shaped cross-sectional profile in the axial portion of the blocking means 10 and of the counter-blocking means 14.

In a manner equivalent to forming the blocking means 10 and the counter-blocking means 14 in an inner conductor contact element 3 formed as a flat contact in a straight plug connector 1 according to FIGS. 5A to 5F, the blocking means 10 and the counter-blocking means 14 of an angled plug connector 1 are implemented as follows:

The blocking means 10 of the inner conductor contact element 3 is composed of a groove 12 on mutually opposite sides of the external face 9 of the inner conductor contact element 3. The associated counter-blocking means 14 of the isolator element 6 is in each case composed of a web 15 on the internal face 13 of laterally mutually opposite lateral walls 43 of the isolator element 6.

In order to be able to move the inner conductor contact element 3 axially within the webs 15, which are in each case formed on the internal face 13 of a lateral wall 43 of the two mutually opposite lateral walls 43 of the isolator element 6, the spacing between the mutually opposite webs 15 can be enlarged by virtue of the dimensionally elastic cross-sectional profile in the axial portion of the isolator element 6 in which the counter-blocking means 14 is formed. The originally U-shaped cross-sectional profile of the isolator element 6 in the first assembly step according to FIG. 7A transitions into a cross-sectional profile having lateral walls 43, which are directed obliquely laterally outward, according to FIG. 7C. In the blocked state in which the blocking means 10 is blocked or latched in the counter-blocking means 14, the spacing between the mutually opposite webs 15 of the isolator element 6 is reduced again, and the isolator element 6 re-assumes its U-shaped cross-sectional profile.

A plurality of variants for a blocking means 10 and an associated counter-blocking means 14 are illustrated in FIGS. 8A to 8D:

In all variants, the counter-blocking means 14 is in each case formed as a web 15 which is in each case shaped so as to be delimited in the axial direction, i.e. in a direction of the longitudinal axis L of the plug connector 1, and in a direction perpendicular to the direction of the longitudinal axis L. The web 15 is in particular formed as a latching hook which has a recess 44 for reliable blocking or latching with the associated blocking means 10.

Figure 8A:
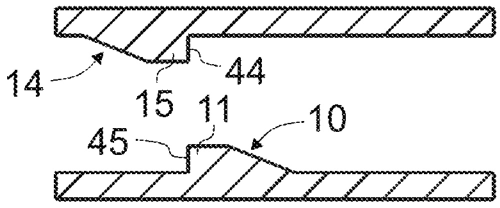
FIGS. 8A to 8D show cross-sectional illustrations of four variants of an embodiment of a blocking mechanism.
Figure 8B:
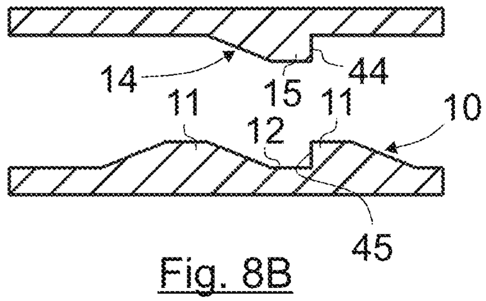
Figure 8C:
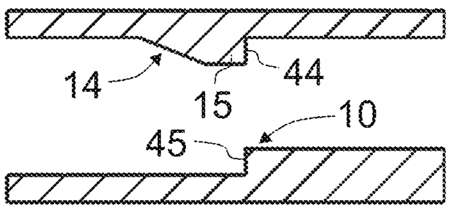
Figure 8D:
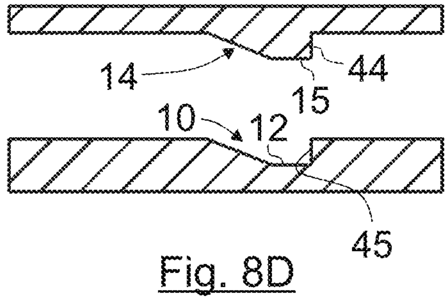

In the first variant according to FIG. 8A, the blocking means 10 is likewise formed as a web 11 on which the web 15 of the counter-blocking means 14 impacts, the web 15 of the counter-blocking means 14 thus being imparted a blocking in a single axial direction. In order for the web 15 of the counter-blocking means 14 to be reliably blocked, the web 11 is formed as a protrusion 45. In the second variant according to FIG. 8B, the blocking means 10 is formed by two axially neighboring webs 11 between which is formed a groove 12. The web 15 of the counter-blocking means 14 latches in the groove 12 and in this way is blocked in both axial directions. In the third variant, the blocking means 10 is formed by a protrusion 45 on which the web 15 of the counter-blocking means 14 impacts and in this way is blocked in an axial direction. In the fourth variant the blocking means 10 is formed by a groove 12 in which the web 15 of the counter-blocking means 14 latches and in this way is blocked in both axial directions. A lateral wall of the groove 12 is formed as a protrusion 45.

In an equivalent manner, the blocking means 10 can assume the development of the counter-blocking means 14 according to FIGS. 8A to 8D, and the counter-blocking means 14 can correspondingly assume one of the four developments of the blocking means 10 illustrated in each case in FIGS. 8A to 8D.

Figure 9A:
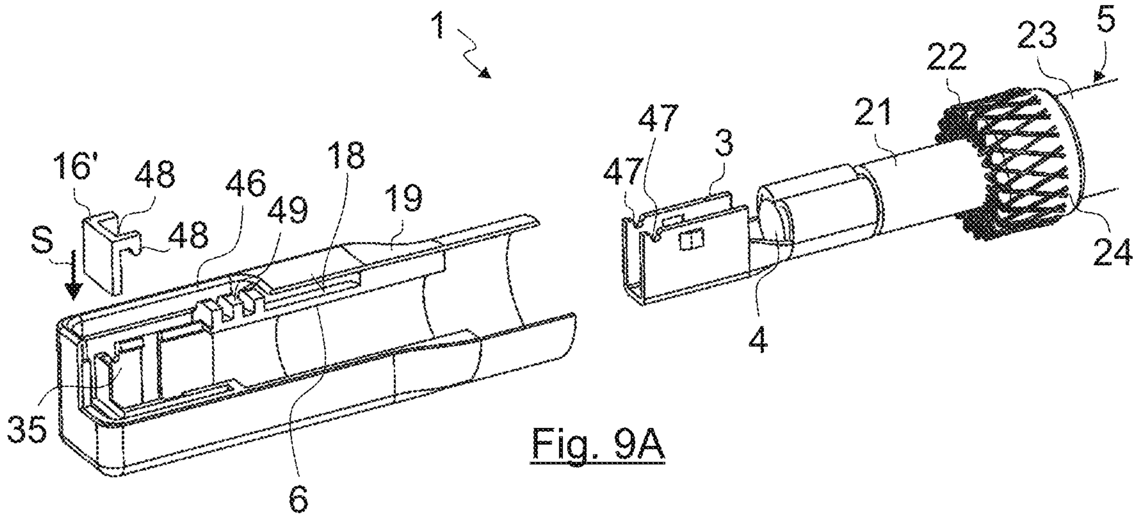
FIGS. 9A, 9B show an isometric illustration of an angled plug connector according to the invention, with a cutout, in the unassembled state and in the assembled state, having a first variant of an independent secondary locking mechanism.
Figure 9B:
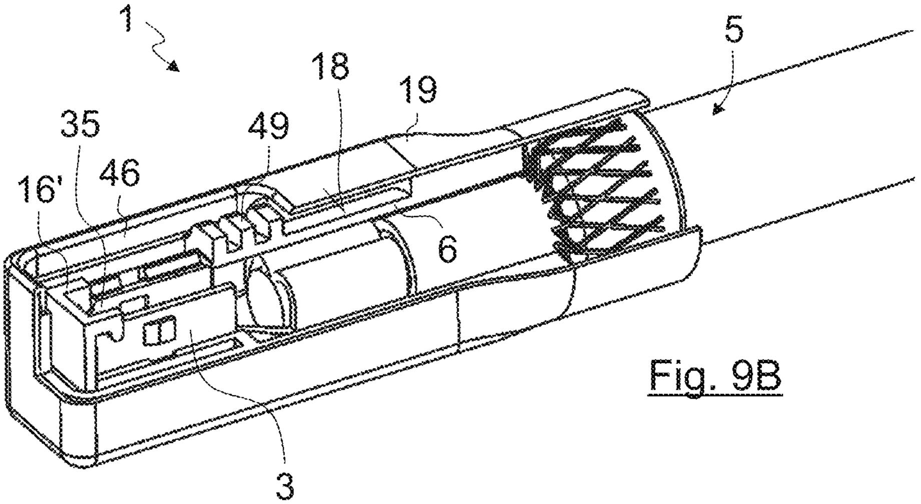

A preassembled angled plug connector 1 having a partial cutout, a secondary locking element 16' and a cable 5 which is prepared with an inner conductor contact element 3 in the unassembled state is derived from FIG. 9A, and a plug connector assembly having a partial cutout consisting of a plug connector 1 according to the invention and a cable 5 in the assembled state is derived from FIG. 9B. The secondary locking element 16' here is embodied as a first variant of an independent secondary locking element and is formed in the manner of a plate, so as to be able to be inserted through the lateral opening 46 of the outer conductor contact element 19 into the intermediate space between the outer conductor contact element 19 and the frontal end of the isolator element 6 and be able to be latched therein. The fixing of the inner conductor contact element 3 takes place by way of counter-latching means 47 which are in each case formed as notches on the upper edges of the two flanges of the inner conductor contact element 3 formed as a U-shaped flat contact, using associated latching means 48 which are formed on elevations of the plate-shaped secondary locking element 16'.

The rib-shaped formation 49 on the outer casing face 18 of the isolator element 6, between the lateral opening 35 of the isolator element 6 and the lateral opening 46 of the outer conductor contact element 19, for lengthening the creepage distance between the inner conductor contact element 3 and the outer conductor contact element 19 in an angled plug connector 1, can be seen in FIGS. 9A and 9B.

Figure 10A:
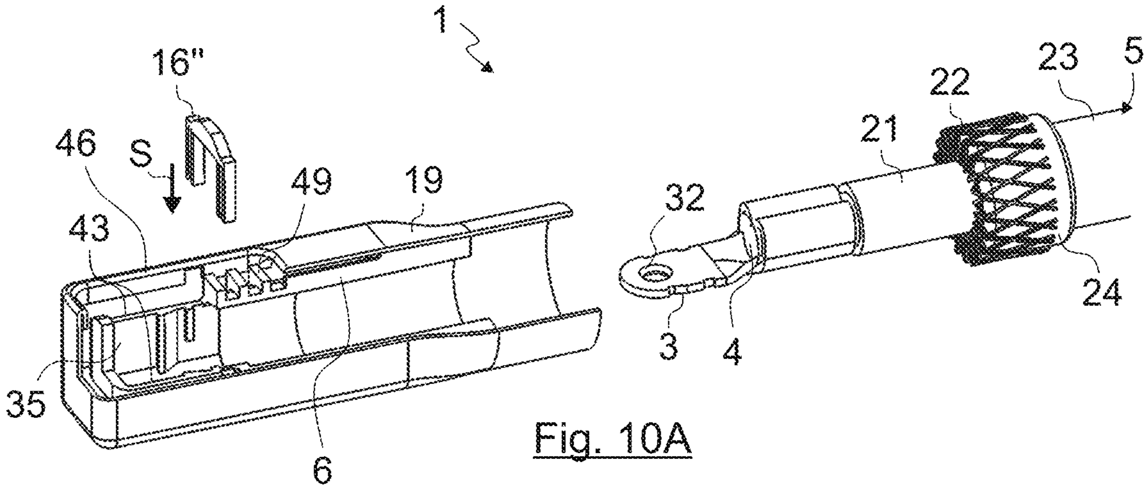
FIGS. 10A, 10B show an isometric illustration of an angled plug connector according to the invention, with a cutout, in the unassembled state and in the assembled state, having a second variant of an independent secondary locking mechanism.
Figure 10B:
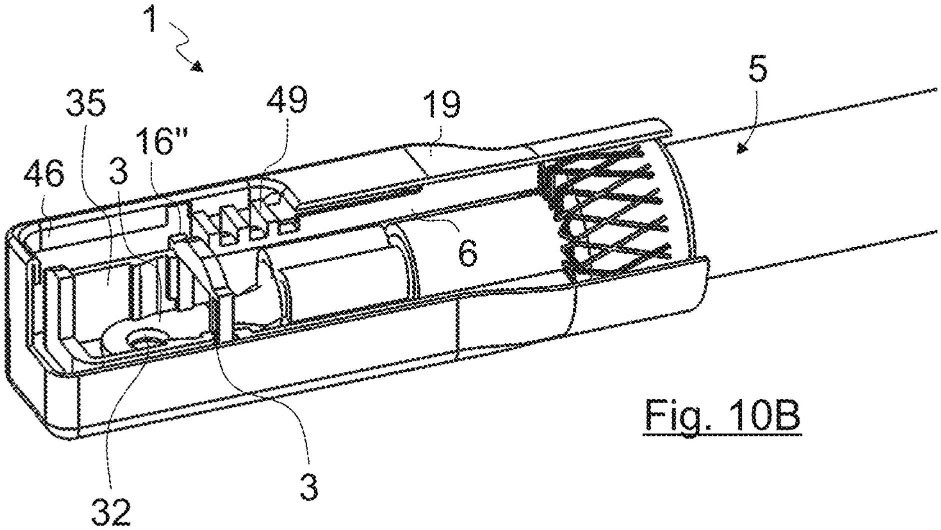

A second variant of an independent secondary locking element 16", which is shaped as a C-shaped clip, is derived from the illustrations of FIGS. 10A and 10B. The C-shaped clip is able to be inserted through the lateral opening 46 of the outer conductor contact element 19 and the lateral opening 35 of the isolator element 6 into the angled plug connector 1, and by way of its two bifurcated ends is able to be plugged and latched to the two mutually opposite lateral walls 43 of the isolator element 6. In the latched state, the secondary locking means 16", which is formed as a C-shaped clip, secures the inner conductor contact element 3 which is fixed in the isolator element 6 and formed as a cable shoe.

Although the present invention has been completely described above on the basis of preferred exemplary embodiments, it is not limited thereto but rather can be modified in a variety of ways.

The invention claimed is:

1. An electrical plug connector comprising an inner conductor contact element and an isolator element that encases the inner conductor contact element at least in portions, wherein a blocking structure is formed on an external face of the inner conductor contact element, and a counter-blocking structure is formed on an internal face of the isolator element, wherein the blocking structure and the counter-blocking structure in a blocked state impact axially on one another, and in an unblocked state are movable axially relative to one another, wherein the isolator element, at least in an axial portion in which the counter-blocking structure is formed, has a cross-sectional profile that is dimensionally elastic in such a manner that a spacing between two mutually opposite regions of the internal face of the isolator element is variable when transitioning between the blocked state and the unblocked state, wherein the elastic cross-sectional profile has an invariable internal circumference, wherein i) the counter-blocking structure is formed as at least one region of the internal face of the insulator element that extends in a circumferential direction orthogonal to a longitudinal axis (L) of the plug connector solely in an associated segment, such that a spacing of the internal face of the isolator element from the longitudinal axis (L) in each segment associated with the counter-blocking structure is reduced in comparison to the spacing of the internal face of the isolator element from the longitudinal axis (L) in each neighboring segment extending in the circumferential direction; or ii) the blocking structure is formed as at least one region of the external face of the inner conductor contact element that extends in each case in a circumferential direction orthogonal to the longitudinal axis (L) of the plug connector solely in a segment, such that, in each segment associated with the blocking structure, a spacing of the external face of the inner conductor contact element from the longitudinal axis (L) is in each case enlarged in comparison to a spacing of the external face of the inner conductor contact element from the longitudinal axis (L) in each neighboring segment extending in the circumferential direction.

2. The electrical plug connector claim 1, wherein a web is in each case formed in at least one mutually opposite region of the two mutually opposite regions of the internal face of the isolator element.

3. The electrical plug connector of claim 1, wherein a web is in each case formed on the external face of the inner conductor contact element, so as to be adjacent to at least one of the two mutually opposite regions of the internal face of the insulator element.

4. The electrical plug connector of claim 1, wherein the spacing between the two mutually opposite regions of the internal face of the isolator element in the blocked state is reduced in comparison to the spacing between the two mutually opposite regions of the internal face of the isolator element in the unblocked state.

5. The electrical plug connector of claim 1, wherein in the unblocked state, the spacing between the two mutually opposite regions of the internal face of the isolator element is at least the size of the largest spacing between two mutually opposite regions of the external face of the inner conductor contact element.

6. The electrical plug connector of claim 1, wherein, in the unblocked state, a spacing between mutually opposite regions of the external face of the inner conductor contact element, of which the spacing of the external face of the inner conductor contact element from the longitudinal axis (L) is in each case reduced in at least one mutually opposite region of the external face of the inner conductor contact element, is at least the size of the smallest spacing between the two mutually opposite regions of the internal face of the isolator element.

7. The electrical plug connector of claim 1, wherein the isolator element, in an axial position of the isolator element in which the counter-blocking means is formed, is configured in a shape of a sleeve, and wherein a spacing between two further mutually opposite regions of the internal face of the isolator element in the unblocked state is reduced in comparison to the blocked state.

8. The electrical plug connector of claim 1, wherein the isolator element, at least in a region in which the counter-blocking structure is formed, has a closed lateral wall which is free from feedthroughs.

9. The electrical plug connector of claim 1, wherein the plug connector is formed in an angular shape, and wherein the isolator element on the outer casing face, proceeding from a lateral opening, is rib-shaped.

10. The electrical plug connector of claim 1, wherein the plug connector is formed in an angular shape, and wherein the isolator element on the outer casing face, proceeding from a lateral opening, meanders in a direction of the longitudinal axis (L) of the plug connector.

11. The electrical plug connector of claim 1, wherein the plug connector has a secondary locking element which comprises mutually opposite regions of the isolator element in which the counter-blocking structure is formed, and wherein the secondary locking element in a plug-in direction (S) of the secondary locking element has a stiff rear first region that, in a terminal latching position of the secondary locking element, is laterally adjacent to the axial portion of the isolator element in which the counter-blocking structure is formed, such that the blocking structure and the counter-blocking structure are secured in the blocked state.

12. The electrical plug connector of claim 11, wherein the secondary locking element comprises a front second region that adjoins the stiff rear first region in the plug-in direction (S) of the secondary locking element, which the front second region, in a preliminary latching position of the secondary locking element, is formed to be elastic in such a manner that the axial portion of the isolator element is moveable laterally outward.

13. The electrical plug connector of claim 11, wherein the secondary locking element comprises a front second region that adjoins the stiff rear first region in the plug-in direction (S) of the secondary locking element, which the front second region, in a preliminary latching position of the secondary locking element, is spaced apart from the isolator element in such a manner that the axial portion of the isolator element is moveable laterally outward.

14. The electrical plug connector of claim 11, wherein, shaped on an inner casing face of the secondary locking element is a latching formation that is configured to latch to a counter-latching formation which, at a preliminary latching position, is formed on an outer casing face of the isolator element.

15. The electrical plug connector of claim 11, wherein, shaped on an inner casing face of the secondary locking element is a latching formation that is configured to latch to a counter-latching formation which, at the terminal latching position is formed on an outer casing face of the isolator element.

16. The electrical plug connector of claim 11, wherein, shaped on an outer casing face of the secondary locking element is a latching formation which, in each of a preliminary latching position and the terminal latching position, is able to latch to a counter-latching formation which is in each case formed on an internal face of an outer conductor contact element.

17. The electrical plug connector of claim 11, wherein, shaped on an outer casing face of the secondary locking element is a latching formation which, in each of a preliminary latching position and the terminal latching position, is in each case able to latch to a counter-latching formation which is in each case formed on an internal face of a plug connector housing of the plug connector.

18. The electrical plug connector of claim 11, wherein the secondary locking element in the terminal latching position elastically deforms the axial portion of the isolator element, in which the counter-blocking structure is formed, such that the counter-blocking structure, in a direction relative to the longitudinal axis (L) of the plug connector, contacts in each case a deepest region of the blocking structure without a gap.

19. The electrical plug connector claim 11, wherein the secondary locking element in the terminal latching position elastically deforms the axial portion of the isolator element, in which the counter-blocking structure is formed, such that the blocking structure in a direction relative to the longitudinal axis (L) of the plug connector contacts in each case a deepest region of the counter-blocking structure without a gap.

20. The electrical plug connector of claim 18, wherein an external diameter of the isolator element, in the axial portion in which the counter-blocking structure is formed, is configured to be larger than an external diameter in respective axially neighboring axial portions of the isolator element.

21. The electrical plug connector of claim 1, wherein the internal face of the insulator element comprises a first plurality of segments and a second plurality of segments, such that in each segment of the first plurality of segments a spacing of the internal face from the longitudinal axis (L) is reduced in comparison to the spacing of the internal face from the longitudinal axis (L) in neighboring segments of the second plurality of segments extending in the circumferential direction.

22. The electrical plug connector of claim 1, wherein the external face of the inner conductor contact element comprises a third plurality of segments and a forth plurality of segments, such that in each segment of the third plurality of segment a spacing of the external face from the longitudinal axis (L) is enlarged in comparison to the spacing of the external face from the longitudinal axis (L) in neighboring segments of the fourth plurality of segments extending in the circumferential direction.

23. Electrical plug connection comprising an electrical plug connector and a corresponding electrical mating plug connector, wherein the electrical plug connector includes an inner conductor contact element and an isolator element that encases the inner conductor contact element at least in portions, wherein a blocking structure is formed on an external face of the inner conductor contact element, and a counter-blocking structure means is formed on an internal face of the isolator element, wherein the blocking structure and the counter-blocking structure in a blocked state impact axially on one another, and in an unblocked state are movable axially relative to one another, wherein the isolator element, at least in an axial portion in which the counter-blocking structure is formed, has a cross-sectional profile that is dimensionally elastic in such a manner that a spacing between two mutually opposite regions of the internal face of the isolator element is variable when transitioning between the blocked state and the unblocked state, wherein the elastic cross-sectional profile has an invariable internal circumference, wherein (i) the counter-blocking structure is formed as at least one region of the internal face of the isolator element that extends in each case in a circumferential direction orthogonal to a longitudinal axis (L) of the plug connector solely in an associated segment, such that a spacing of the internal face of the isolator element from the longitudinal axis (L) in each segment associated with the counter-blocking structure is reduced in comparison to the spacing of the internal face of the isolator element from the longitudinal axis (L) in each neighboring segment extending in the circumferential direction; or ii) the blocking structure is formed as at least one region of the external face of the inner conductor contact element that extends in each case in a circumferential direction orthogonal to the longitudinal axis (L) of the plug connector solely in a segment, such that in each segment associated with the blocking structure, a spacing of the external face of the inner conductor contact element from the longitudinal axis (L) is in each case enlarged in comparison to the a spacing of the external face of the inner conductor contact element from the longitudinal axis (L) in each neighboring segment extending in the circumferential direction.

* * * * *